US011634195B1

(12) United States Patent  (10) Patent No.: US 11,634,195 B1
Dupuis et al.  (45) Date of Patent: Apr. 25, 2023

(54) FLOOR TILE FOR MOUNTING AN ACCESSORY THEREON, ACCESSORY FOR MOUNTING TO A FLOOR TILE, AND FLOOR TILE AND ACCESSORY ASSEMBLY

(71) Applicant: BOMBARDIER RECREATIONAL PRODUCTS INC., Valcourt (CA)

(72) Inventors: Felix Dupuis, Windsor (CA); Richard Simard, Drummondville (CA); Marc-Etienne Bessette, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 117 days.

(21) Appl. No.: 16/887,481

(22) Filed: May 29, 2020

Related U.S. Application Data

(60) Provisional application No. 62/855,502, filed on May 31, 2019.

(51) Int. Cl.
  *B63B 29/06* (2006.01)
  *B63B 17/00* (2006.01)
  *B60N 2/015* (2006.01)

(52) U.S. Cl.
  CPC ............ *B63B 29/06* (2013.01); *B60N 2/0155* (2013.01); *B60N 2/01508* (2013.01); *B60N 2/01516* (2013.01); *B60N 2/01558* (2013.01); *B60N 2/01566* (2013.01); *B63B 17/00* (2013.01)

(58) Field of Classification Search
  CPC ... B63B 17/00; B63B 29/04; B63B 2029/043; B63B 2029/046; B63B 29/06; B63B 29/08; B63B 29/12; B60N 2/01508; B60N 2/01516; B60N 2/0155; B60N 2/01558; B60N 2/01566
  See application file for complete search history.

(56) References Cited

U.S. PATENT DOCUMENTS

| 3,221,616 | A | * | 12/1965 | Flegel | E03F 5/046 49/464 |
| 3,266,200 | A | * | 8/1966 | Block | B24D 7/16 403/348 |
| 3,677,195 | A | * | 7/1972 | Prete, Jr. | B64D 9/003 410/105 |
| 3,776,649 | A | * | 12/1973 | Kemezys | F16C 11/069 403/90 |
| 4,789,126 | A | * | 12/1988 | Rice | B60N 2/01566 297/15 |

(Continued)

*Primary Examiner* — Ajay Vasudeva
(74) *Attorney, Agent, or Firm* — BCF LLP

(57) ABSTRACT

A floor tile has arcuate slots formed on its upper surface and defined about a common center of curvature. A positioning cavity is formed on the upper surface and located radially outward from a common radius of curvature of the arcuate slots. An accessory comprises a base having a bottom section. An attachment member is pivotally mounted to the base and has two arcuate hooks extending under the bottom section of the base. A locating projection extends under the bottom section of the base, being located radially outward from a pivot axis of the attachment member. To mount the accessory on the floor tile, the arcuate hooks are received in the arcuate slots and the locating projection is received in the positioning cavity. Pivoting the attachment member causes locking or unlocking of the arcuate hooks in the arcuate slots for attaching or detaching the accessory on the floor tile.

21 Claims, 16 Drawing Sheets

(56) References Cited

U.S. PATENT DOCUMENTS

| | | | | | |
|---|---|---|---|---|---|
| 4,955,575 | A | * | 9/1990 | Moore | B60N 2/01558 |
| | | | | | 297/15 |
| 5,232,303 | A | * | 8/1993 | Rubner | A47B 13/021 |
| | | | | | 403/252 |
| 6,145,912 | A | * | 11/2000 | Rice | B60N 2/01558 |
| | | | | | 296/65.03 |
| 6,739,281 | B1 | * | 5/2004 | Grimes | B63B 29/06 |
| | | | | | 114/364 |
| 8,516,971 | B1 | * | 8/2013 | Natoce | B63B 5/06 |
| | | | | | 114/364 |
| 11,046,233 | B1 | * | 6/2021 | Royt | B60P 7/0807 |
| 2021/0024177 | A1 | * | 1/2021 | Perkins | B63B 29/06 |

* cited by examiner

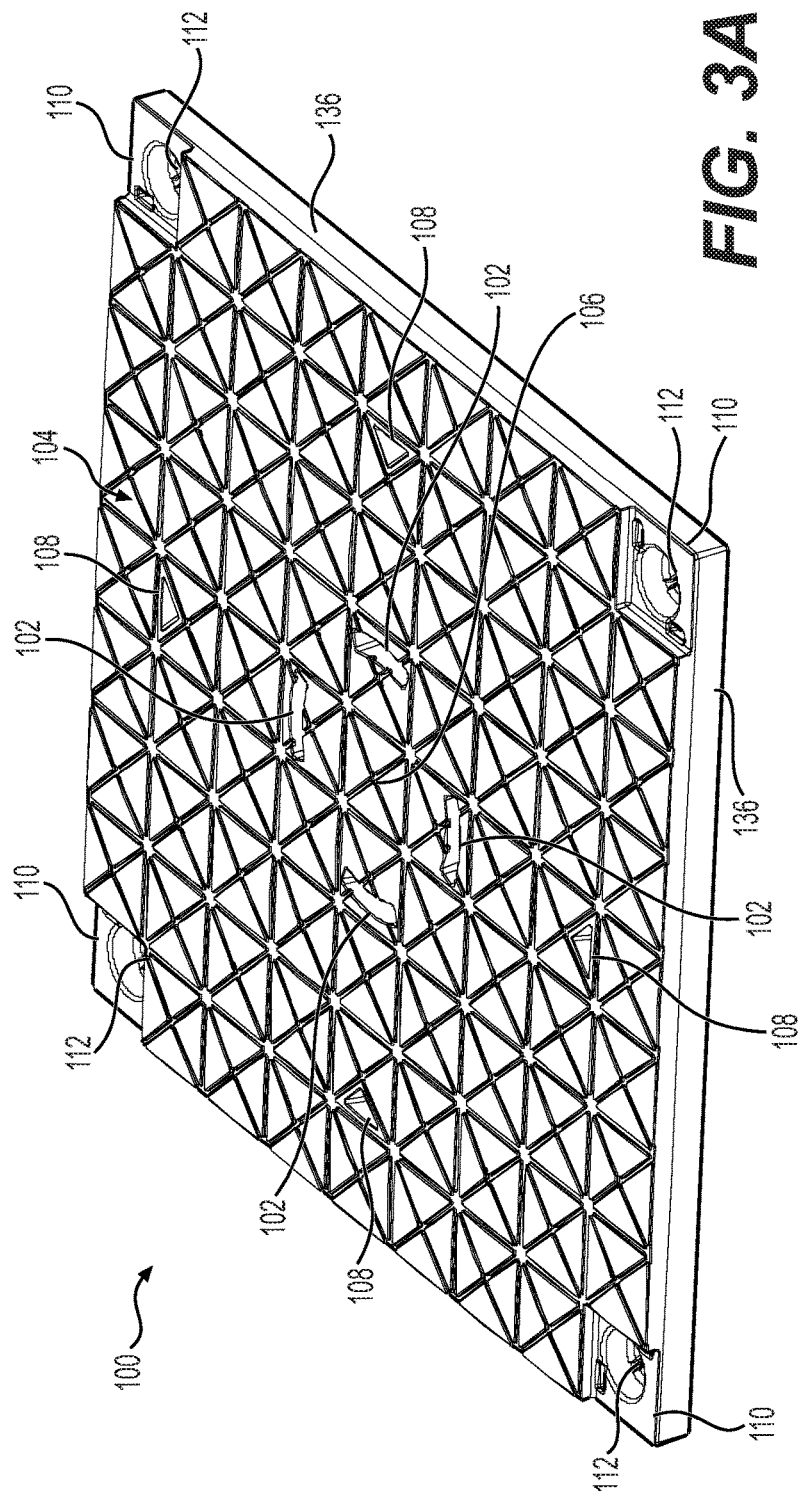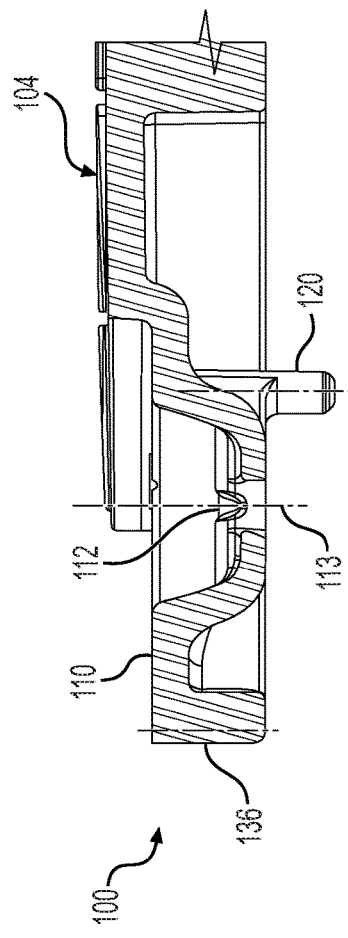
*FIG. 3A*
*FIG. 3B*

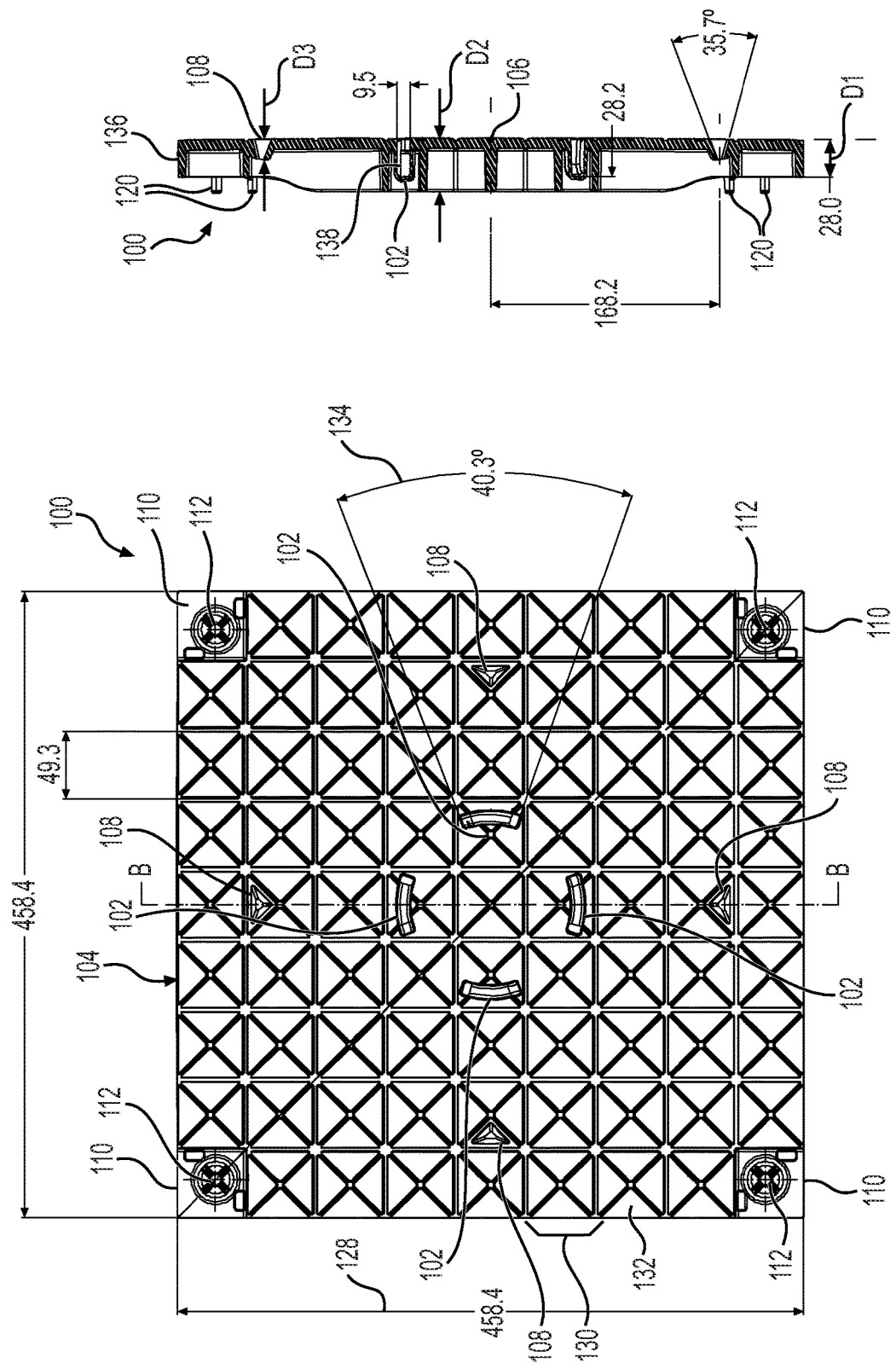

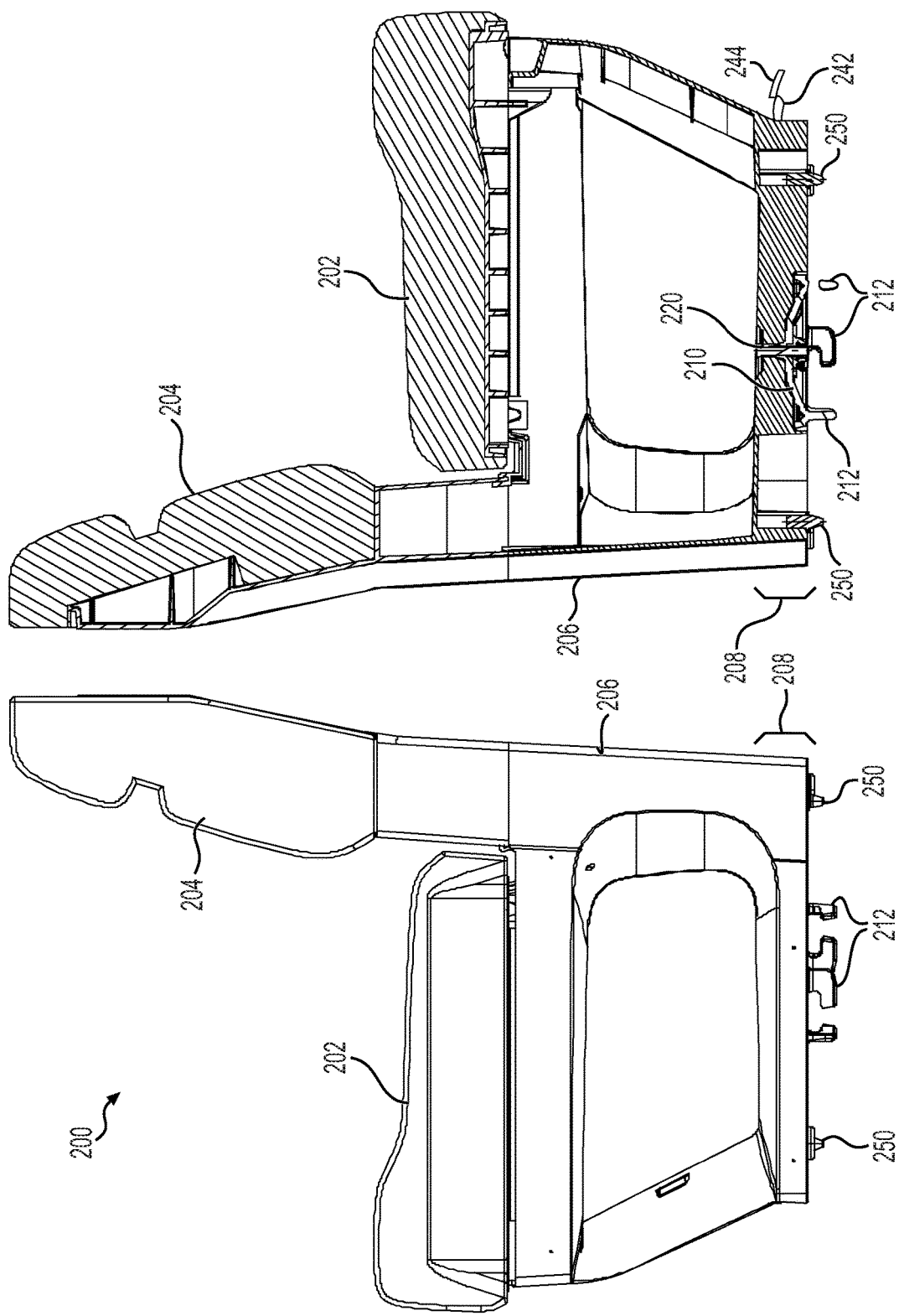

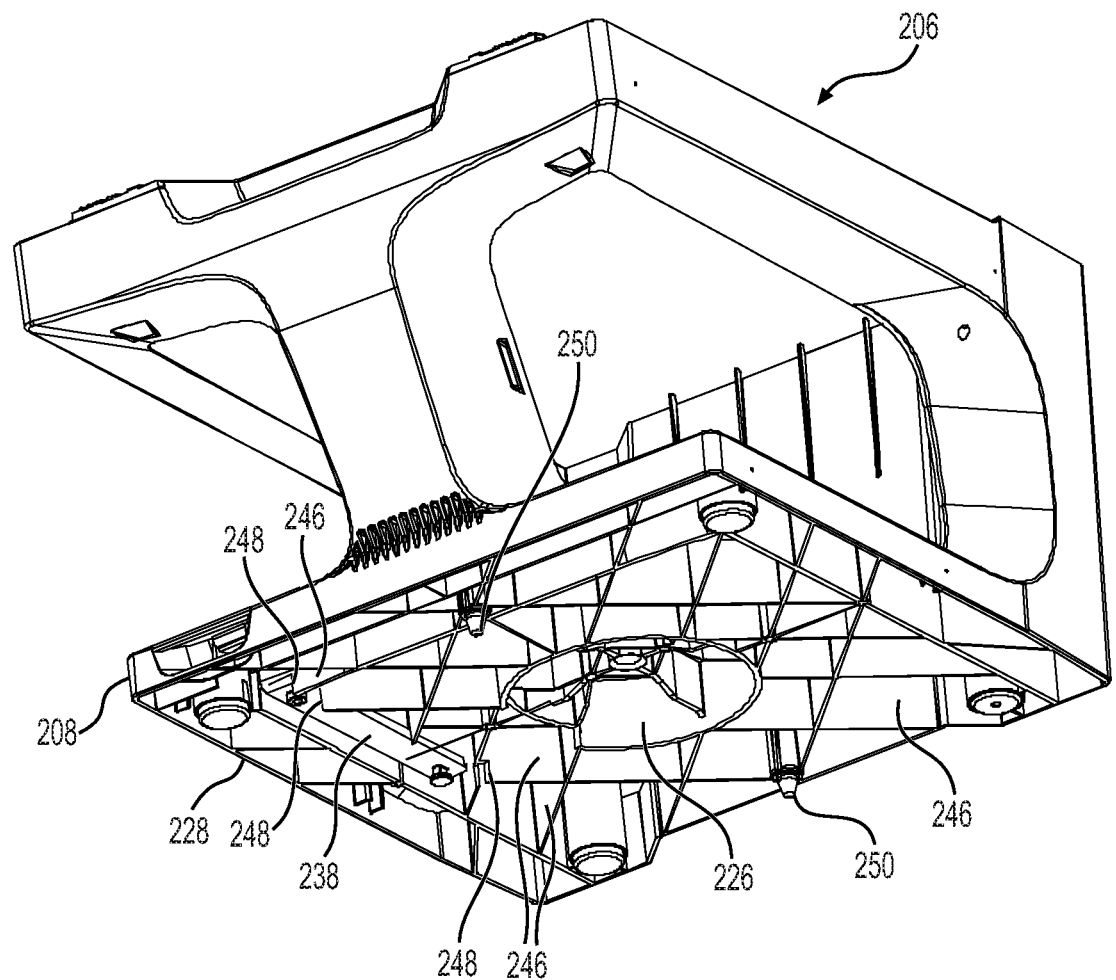
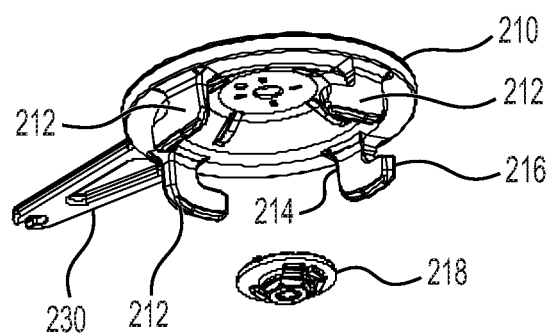
FIG. 16

FLOOR TILE FOR MOUNTING AN ACCESSORY THEREON, ACCESSORY FOR MOUNTING TO A FLOOR TILE, AND FLOOR TILE AND ACCESSORY ASSEMBLY

CROSS-REFERENCE

The present application claims priority from U.S. Provisional Patent Application Ser. No. 62/855,502, filed on May 31, 2019, the disclosure of which is incorporated by reference herein.

FIELD OF TECHNOLOGY

The present technology relates to a floor tile for mounting an accessory thereon, an accessory for mounting to a floor tile, and a floor tile and accessory assembly.

BACKGROUND

Most recreational watercraft such as small boats, pontoon boats and the like are conventionally provided with accessories, such as chairs and tables, which are permanently installed on their decks. When a watercraft deck is sufficiently large, it is possible to add more accessories, for example additional chairs. For example, a chair may simply be placed on a deck without attachment, this arrangement being a potential cause of hazard due to movements of the watercraft. Alternatively, a chair or a table may be permanently attached to the deck, this arrangement requiring piercing holes in the deck for installation of bolts or screws. In that case, any desired change of configuration, for example moving a chair, will leave unsightly holes on the surface of the deck.

In view of the foregoing, there is a desire for a floor attachment system that allows installing various accessories in modifiable configurations that is both easy and convenient for the user to attach and detach, while also being strong enough to resist the pull-out loads that such accessories can be subject to.

SUMMARY

It is an object of the present technology to ameliorate at least some of the inconveniences present in the prior art.

According to one aspect of the present technology, there is provided a floor tile having four arcuate slots formed on an upper surface of the floor tile and defined about a common center of curvature of the four arcuate slots; and at least one positioning cavity formed on the upper surface of the floor tile and located radially outward from a common radius of curvature of the four arcuate slots.

In some embodiments of the present technology, a sum of angular sweeps of the four arcuate slots is less than 180 degrees.

In some embodiments of the present technology, each of the four arcuate slots has an angular sweep of about 40 degrees.

In some embodiments of the present technology, the floor tile has a rectangular shape; each of the four arcuate slots has an arc length of about one tenth of a minimum side length of the floor tile and a width of about one fifth of the arc length; the common radius of curvature of the four arcuate slots is in a range of 1.3 to 1.5 times the arc length of each of the four arcuate slots; and the at least one positioning cavity is located at a distance from the common center of curvature of the four arcuate slots that is at in a range between twice the common radius of curvature of the four arcuate slots and half the minimum side length of the floor tile.

In some embodiments of the present technology, the floor tile has a square shape.

In some embodiments of the present technology, the minimum side length of the floor tile is about 458 mm; the arc length of the four arcuate slots is about 45 mm; the common radius of curvature of the four arcuate slots is about 64 mm; the width of the four arcuate slots is about 9 mm; and the at least one positioning cavity is located at about 168 mm from the common center of curvature of the four arcuate slots.

In some embodiments of the present technology, each arcuate slot further comprises a bottom having a lateral opening, a common depth of the four arcuate slots defined by their respective bottoms being greater than a depth of the at least one positioning cavity.

In some embodiments of the present technology, the at least one positioning cavity comprises two positioning cavities.

In some embodiments of the present technology, the two positioning cavities are diametrically opposed about the common center of curvature of the four arcuate slots.

In some embodiments of the present technology, two positioning cavities are located at equal distances from the common center of curvature of the four arcuate slots.

In some embodiments of the present technology, the at least one positioning cavity comprises four positioning cavities.

In some embodiments of the present technology, the four positioning cavities are located at equal distances from the common center of curvature of the four arcuate slots.

In some embodiments of the present technology, the common center of curvature of the four arcuate slots, two of the four positioning cavities and two of the four arcuate slots define a first axis parallel to a side of the floor tile; and the common center of curvature of the four arcuate slots, another two of the four positioning cavities and another two of the four arcuate slots define a second axis perpendicular to the first axis.

In some embodiments of the present technology, the common center of curvature of the four arcuate slots is a center of the floor tile.

In some embodiments of the present technology, the upper surface of the floor tile comprises a gripping texture.

In some embodiments of the present technology, the gripping texture of the upper surface of the floor tile is formed of a repeating triangular pattern.

In some embodiments of the present technology, the floor tile further comprises four through apertures, each one of the four through apertures being located in a corresponding one of four corners of the floor tile, each through aperture having an aperture axis perpendicular to the upper surface of the floor tile, each through aperture being adapted for receiving a fastener via the upper surface of the floor tile for attaching the floor tile to a receiving structure.

In some embodiments of the present technology, the floor tile further comprises four mounting cavities, each one of the four mounting cavities being formed in a corresponding one of the four corners of the floor tile, each through aperture being countersunk within a corresponding mounting cavity, the mounting cavity being adapted for receiving a cap positionable over the though aperture and the fastener.

In some embodiments of the present technology, the at least one positioning cavity is a positioning recess.

According to another aspect of the present technology, there is provided an accessory including a base having a bottom section; an attachment member pivotally mounted to the base, the attachment member comprising at least two arcuate hooks extending under the bottom section of the base; and at least one locating projection extending under the bottom section of the base and located radially outward from a pivot axis of the attachment member.

In some embodiments of the present technology, the accessory is a boat accessory.

In some embodiments of the present technology, the accessory is selected from a chair and a table.

In some embodiments of the present technology, the accessory further comprises a link positioned within the base, the link having a medial end connected to the attachment member and a lateral end opposite from the medial end; and an arm having a proximal end pivotably connected to the lateral end of the link and a distal end protruding outside of the base; sliding the arm partially in or out of the base by action on the distal end causing pivoting of the attachment member about the pivot axis of the attachment member.

In some embodiments of the present technology, the accessory further comprises reinforcing ribs disposed within the bottom section of the base and surrounding the attachment member, a void being formed in the reinforcing ribs to allow displacement of the arm and the link.

In some embodiments of the present technology, the accessory further comprises a handle mounted to the distal end of the arm.

In some embodiments of the present technology, a sum of angular sweeps of the at least two arcuate hooks is less than 90 degrees.

In some embodiments of the present technology, each of the at least two arcuate hooks has an angular sweep of about 36 degrees.

In some embodiments of the present technology, the bottom section of the base defines a generally square shape; each of the at least two arcuate hooks has an arc length of about one eleventh of a side length of the bottom section of the base and a width ranging from one fourth to one fifth of the arc length; the pivot axis of the attachment member is a common center of curvature of the at least two arcuate hooks; a common radius of curvature of the at least two arcuate hooks is in a range from 1.4 to 1.8 times the arc length of each of the at least two arcuate hooks; and the at least one locating projection is located radially outward from the pivot axis of the attachment member, at a distance from the pivot axis of the attachment member that is at in a range between twice the common radius of curvature of the at least two arcuate hooks and half a side length of the bottom section of the base.

In some embodiments of the present technology, the side length of the bottom section of the base is about 458 mm; the arc length of each of the at least two arcuate hooks is about 40 mm; the common radius of curvature the at least two arcuate hooks is about 64 mm; the width of each of the at least two arcuate hooks is about 8 mm; and the at least one locating projection is located at about 168 mm from the pivot axis of the attachment member.

In some embodiments of the present technology, the pivot axis of the attachment member is a center of the generally square shape defined by the bottom section of the base.

In some embodiments of the present technology, two of the at least two arcuate hooks are diametrically opposed about the pivot axis of the attachment member.

In some embodiments of the present technology, the at least one locating projection comprises two locating projections.

In some embodiments of the present technology, the two locating projections are diametrically opposed about the pivot axis of the attachment member.

In some embodiments of the present technology, the two locating projections are located at equal distances from the pivot axis of the attachment member.

In some embodiments of the present technology, the at least two arcuate hooks comprise four arcuate hooks; and the four arcuate hooks share a common radius of curvature.

In some embodiments of the present technology, the at least two arcuate hooks comprise four arcuate hooks; and the common radius of curvature of the at least two arcuate hooks is a common radius of curvature of the four arcuate hooks.

In some embodiments of the present technology, the pivot axis of the attachment member and mid-points of two of the four arcuate hooks define a first axis; and the pivot axis of the attachment member and mid-points of another two of the four arcuate hooks define a second axis perpendicular to the first axis.

In some embodiments of the present technology, the at least one locating projection comprises two locating projections.

In some embodiments of the present technology, the two locating projections are located at equal distances from the pivot axis of the attachment member.

In some embodiments of the present technology, the pivot axis of the attachment member and the two locating projections are positioned on a third axis parallel to a lateral side of the accessory.

In some embodiments of the present technology, the attachment member comprises a disk pivotally mounted to the base; each of the at least two arcuate hooks comprises a foot fixedly connected to the disk and a free end extending perpendicularly from the foot.

In some embodiments of the present technology, an arc length of each of the free ends is greater than an arc length of each of the feet.

In some embodiments of the present technology, the accessory further comprises a nut disposed underneath the attachment member; and a fastener engaging the nut, the attachment member and the base, the attachment member being pivotally mounted to the base by the fastener and the nut.

According to a further aspect of the present technology, there is provided a floor tile and accessory assembly having a floor tile, the floor tile including: four arcuate slots formed on an upper surface of the floor tile and defined about a common center of curvature of the four arcuate slots, and at least one positioning cavity formed on the upper surface of the floor tile and located radially outward from a common radius of curvature of the four arcuate slots; the assembly also having an accessory adapted for being mounted on the floor tile, the accessory including a base having a bottom section, an attachment member pivotally mounted to the base, the attachment member comprising between two and four arcuate hooks extending under the bottom section of the base, the arcuate hooks being selectively received in a corresponding number of the four arcuate slots of the floor tile, and at least one locating projection extending under the bottom section of the base and located radially outward from a pivot axis of the attachment member, the at least one locating projection being selectively received in the at least one positioning cavity of the floor tile; wherein pivoting the attachment member in a first direction causes locking of the arcuate hooks in the arcuate slots for attaching the accessory on the floor tile and pivoting the attachment member in a second direction opposite from the first direction causes unlocking of the arcuate hooks from the arcuate slots and allows removal of the accessory from the floor tile.

In some embodiments of the present technology, the base of the accessory further comprises: a link positioned within the base, the link having a medial end connected to the attachment member and a lateral end opposite from the medial end; and an arm having a proximal end pivotably connected to the lateral end of the link and a distal end protruding outside of the base; sliding the arm partially in or out of the base by action on the distal end causing pivoting of the attachment member about the pivot axis of the attachment member and causing locking of the arcuate hooks selectively received in the corresponding number of the four arcuate slots of the floor tile.

In some embodiments of the present technology, the at least one positioning cavity of the floor tile comprises two positioning cavities.

In some embodiments of the present technology, the at least one positioning cavity of the floor tile comprises four positioning cavities.

In some embodiments of the present technology, the pivot axis of the attachment member is a common center of curvature of the arcuate hooks.

In some embodiments of the present technology, the pivot axis of the attachment member is coaxial with the common center of curvature of the four arcuate slots when the accessory is mounted on the floor tile.

In some embodiments of the present technology, a common arc length of the four arcuate slots is greater than a common arc length of each of the arcuate hooks; a common radius of curvature of the four arcuate slots is equal to a common radius of curvature of the arcuate hooks; a common width of the four arcuate slots is greater than a common width of each of the arcuate hooks; and a distance from the at least one positioning cavity to the common center of curvature of the four arcuate slots is equal to a distance from the at least one locating projection to the pivot axis of the attachment member.

In some embodiments of the present technology, the common arc length of the four arcuate slots is about 45 mm; the common radius of curvature of the four arcuate slots is about 64 mm; the common width of the four arcuate slots is in a range about 9 mm; the at least one positioning cavity is located at about 168 mm from the common center of curvature of the four arcuate slots; the common arc length of each of the arcuate hooks is about 40 mm; the common radius of curvature of the arcuate hooks is about 64 mm; the common width of each of the arcuate hooks is about 8 mm; and the at least one locating projection is located at about 168 mm from the common center of curvature of the arcuate hooks.

In some embodiments of the present technology, the attachment member of the accessory comprises a disk pivotally mounted to the base of the accessory; each of the arcuate hooks of the accessory comprises a foot fixedly connected to the disk and a free end extending perpendicularly from the foot; and the common arc length of each of the arcuate hooks is a common arc length of the free ends of the arcuate hooks and is greater than a common arc length of the feet of the arcuate hooks.

In some embodiments of the present technology, each arcuate slot of the floor tile further comprises a bottom having a lateral opening; and pivoting the attachment member in the first direction causes the free ends of the arcuate hooks to protrude from the four arcuate slots via the lateral openings.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3a is a top perspective view of a floor tile in accordance with an embodiment of the present technology;

FIG. 3b is a cross-sectional elevation view of a portion of the floor tile of FIG. 3a;

FIG. 4 is an elevation view of the floor tile of FIG. 3a;

FIG. 5 is a bottom plan view of the floor tile of FIG. 3a;

FIG. 6a is a close-up view of portion A of FIG. 5 showing details of an arcuate slot of the floor tile of FIG. 3a;

FIG. 6b is a close-up view of portion A of FIG. 5 showing dimensions of an arcuate slot of the floor tile of FIG. 3a;

FIG. 7 is a bottom perspective view of the floor tile of FIG. 3a;

FIG. 8 is a top plan view of a floor tile, showing dimensions of the floor tile in accordance with an embodiment of the present technology;

FIG. 9 is a cross-sectional view of the floor tile of FIG. 8 taken through line B-B of FIG. 8, showing further dimensions of the floor tile in accordance with an embodiment of the present technology;

FIG. 14 is a left side elevation view of the chair of FIG. 13;

FIG. 15 is a right side cutaway view of the chair of FIG. 13;

FIG. 16 is a partial, lower left perspective and exploded view of the chair of FIG. 13;

DETAILED DESCRIPTION

The present technology will be described with respect to a watercraft having a substantially flat deck, for example a pontoon boat, floor tiles affixed to the deck being configured for mounting chairs thereon. However, it is contemplated that the present technology could be applied to mounting other accessories, such as for example tables, on the deck of a watercraft or on various other surfaces, such as for example docks. Application of the present technology is therefore not intended to be limited to its use in mounting chairs on watercrafts.

Generally speaking, the present technology introduces a floor attachment system for mounting accessories, for example chairs and tables, on a flat surface, for example a deck of a watercraft. The floor attachment system comprises a plurality of floor tiles that may be fixedly attached on the flat surface. The floor tiles may be shaped as squares, rectangles, triangles or other shapes that may be assembled to form a continuous floor surface. Each floor tile includes a plurality of arcuate slots, for example four (4) arcuate slots, and at least one positioning cavity. Each accessory has, in its base, a plurality of arcuate hooks, for example at least two (2) arcuate hooks, mounted on a pivoting attachment member and at least one locating projection, for example a locating pin. The arcuate hooks and the locating projection extend underneath the base of the accessory. The arcuate hooks are adapted to be received in the arcuate slots of a selected floor tile and the locating projection is adapted to be received in the positioning cavity of the selected floor tile. A handle mounted to the base of the accessory allows the attachment member to be pivoted, sliding and locking the arcuate hooks in the arcuate slots and effectively locking the accessory on the floor tile. A plurality of floor tiles may be disposed on the flat surface to provide a flexible and modular floor assembly on which various accessories may be mounted in variable configurations.

When the floor attachment system is used in marine applications, an occupant may use an accessory, for example a chair, as a handhold, causing the application of significant loads, in particular pull-out loads, on the chair and on the floor tile, and thus on the attachment system that connects the two. The floor tile and the attachment system are constructed to be able to withstand loads applied vertically or transversally on the floor tile, either directly or via the accessory.

Figure 1:
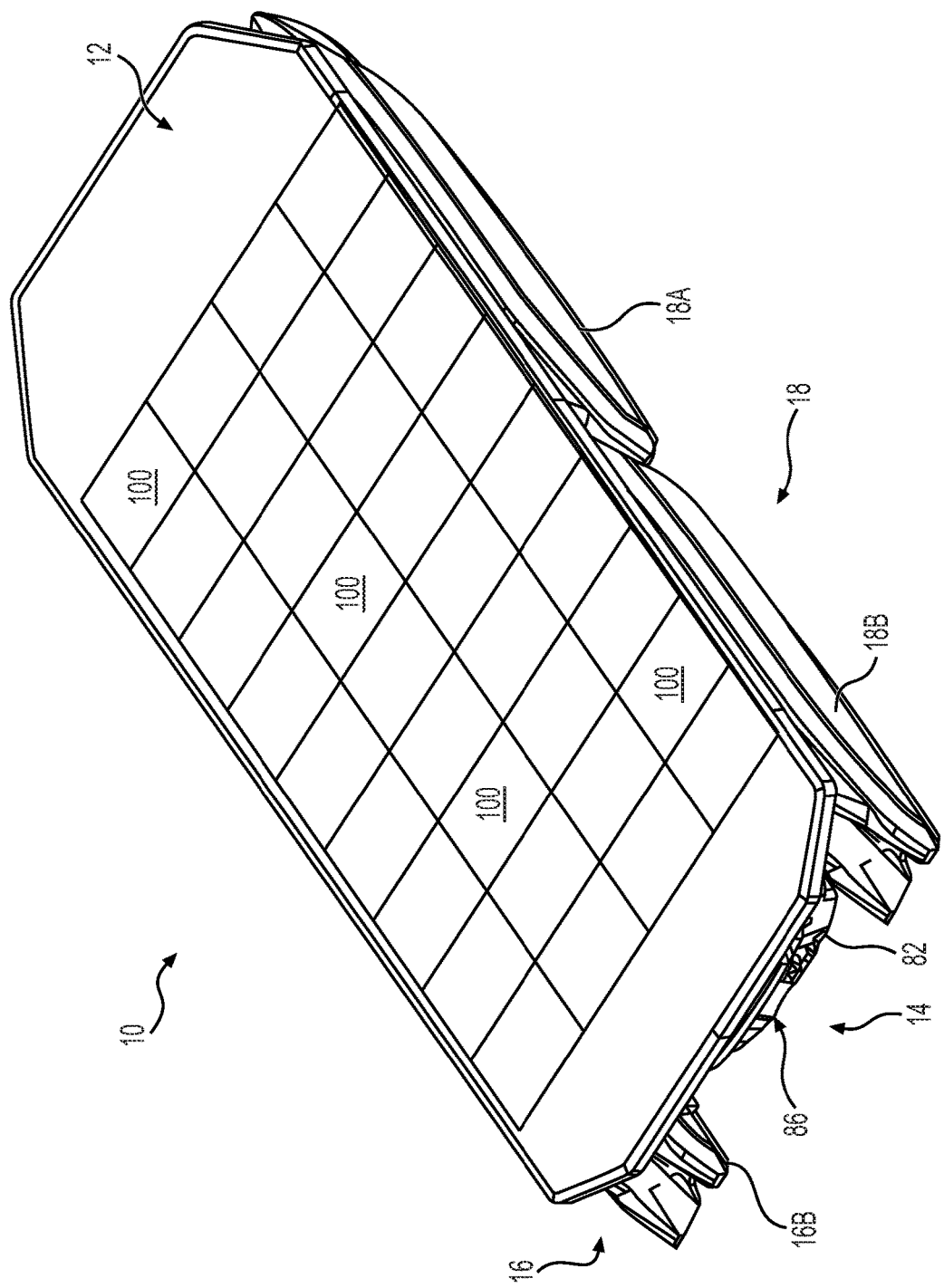
FIG. 1 is a rear left perspective view of a pontoon boat in accordance with an embodiment of the present technology.
Figure 2:
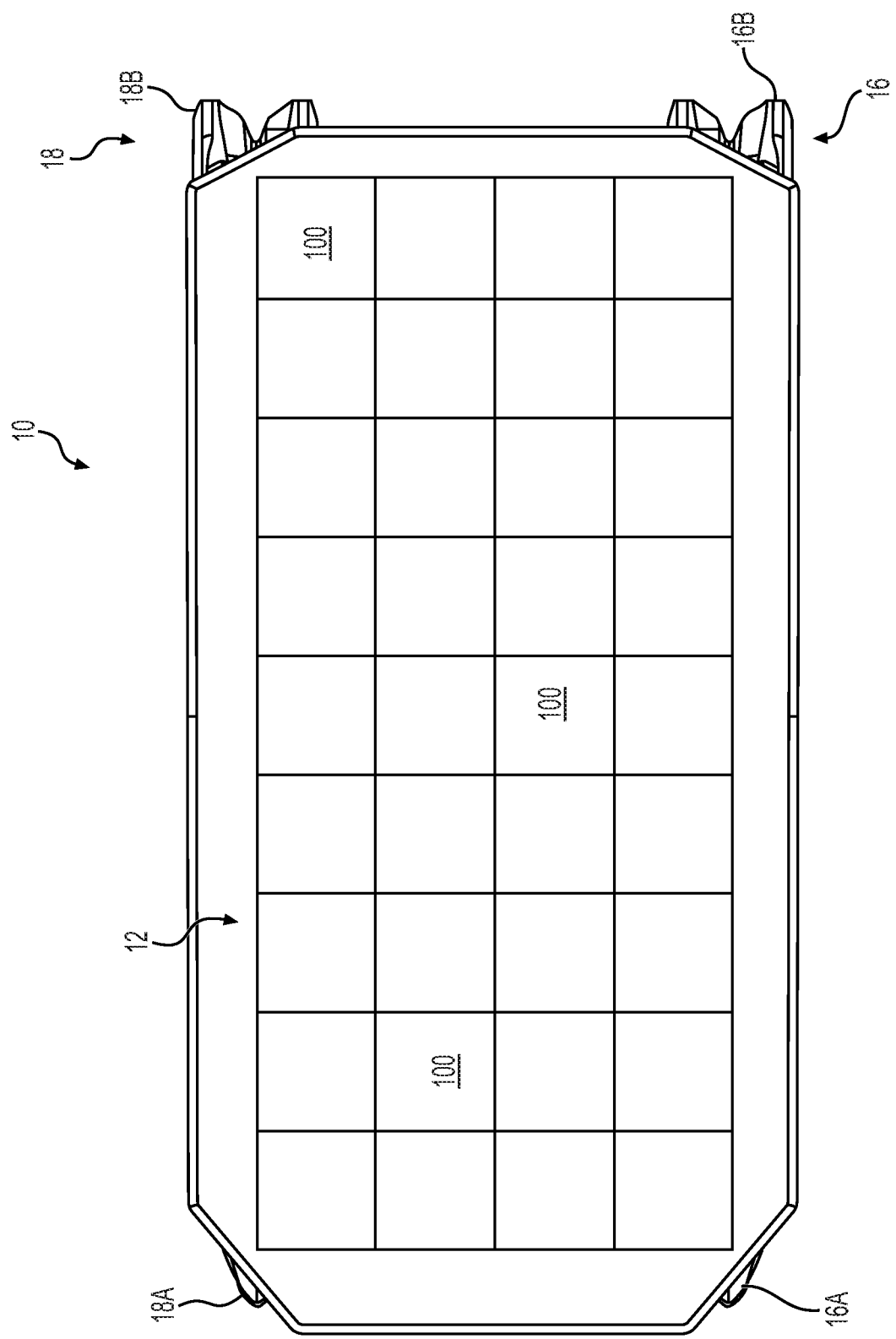
FIG. 2 is a top plan view of the pontoon boat of FIG. 1.

A pontoon boat in accordance with one embodiment of the present technology is shown in FIGS. 1 and 2. The following description relates to one example of a watercraft 10, for example a pontoon boat. Those of ordinary skill in the art will recognize that there are other known types of watercrafts incorporating different designs and that the present technology would encompass these other watercrafts. The watercraft 10 has a deck 12, a central pod 14, a left pod 16 and a right pod 18. The pods 14, 16, 18 are connected to a bottom of the deck 12. The central pod 14 is laterally centered relative to the deck 12. The left and right pods 16, 18 are disposed to the left and right of the central pod 14 respectively. The pods 14, 16, 18 buoyantly support the deck 12 above water.

The left pod 16 is made of a front sub-pod 16A and a rear sub-pod 16B disposed rearward of the front sub-pod and being laterally aligned therewith. Similarly, the right pod 18 is made of a front sub-pod 18A and a rear sub-pod 18B disposed rearward of the front sub-pod 18B and being laterally aligned therewith. It is contemplated that each of the left and right pods 16, 18 could be formed by a single pod or by more than two sub-pods. The sub-pods 16A, 16B, 18A, 18B are connected to the bottom of the deck 12. The central pod 14 has a central hull 84 supporting a jet propulsion system 86.

The boat 10 is propelled by a jet propulsion system 86 powered by a motor (not shown). The jet propulsion system 86 has a steering nozzle (not shown) used for steering the boat 10. A steering wheel (not shown) is operatively connected to the steering nozzle. A throttle lever (not shown) is operatively connected to the motor for controlling operation of the motor. The steering wheel and the throttle lever are located on a command console provided on the deck 12. The command console is not shown in the figures in order to properly show the top surface of the deck 12. It is contemplated that other propulsion systems, such as a stern drive or a marine outboard engine, may be used to propel the boat 10. It is also contemplated that the steering wheel could be replaced by a handlebar and that the steering nozzle could be replaced by one or more rudders.

A majority of the deck 12 is covered by floor tiles 100 affixed to a surface of the deck 12. The floor tiles 100 are schematically illustrated in FIGS. 1 and 2. The floor tiles 20 are attached to the deck 12 using fasteners, such as screws or bolts (shown in later Figures). In the present embodiment all of the floor tiles 100 are the same, but it is contemplated that some of the floor tiles may differ from the others.

In FIG. 2, relative sizes of the floor tiles 100 and of the watercraft 10 or of its various parts are for illustration only and are not intended to limit the present disclosure.

FIGS. 3a to 9 illustrate one of the floor tiles 100 according to an embodiment. The floor tile 100 has a rectangular shape, specifically a square shape. A variant of the floor tile 100 having a rectangular shape with adjacent sides of unequal lengths is described hereinbelow. Four arcuate slots 102 are formed on an upper surface 104 of the floor tile 100. The arcuate slots 102 are defined about a common center of curvature 106 of the four arcuate slots 102 and are positioned at a common radius of curvature of the four arcuate slots 102 from the common center of curvature 106. The arcuate slots 102 are open both on the upper surface 104 of the floor tile 100 and on an opposite end. As best seen on FIG. 6a, which is not to scale, each arcuate slot 102 has a bottom 138 extending over a major part of an arc length of the arcuate slot 102, a lateral opening 139 being cut on a side of the arcuate slot 102.

Four positioning cavities 108 are formed on the upper surface 104 of the floor tile 100 and located radially outward from the common radius of curvature of the four arcuate slots 102. In the present embodiment, the cavities 108 are recesses having a closed bottom. It is contemplated that the cavities 108 may consist of holes that fully pierce a material of the floor tile 100. It is contemplated that there could be more or less than four positioning cavities 108.

A gripping texture is formed on the upper surface 104 of the floor tile 100. In the present embodiment, the gripping texture consists of repeating triangular pattern.

The floor tile 100 has a perimetric wall 136 that extends perpendicularly from the upper surface 104. A mounting cavity 110 and a through aperture 112 are positioned on each corner of the floor tile 100. On each corner, the through aperture 112 has an aperture axis 113 (FIG. 3b) perpendicular to the upper surface 104 of the floor tile 100 and is countersunk within a corresponding mounting cavity 110. Fasteners 160 (FIG. 11) are inserted via the through apertures 112 for fixedly attaching the floor tile 100 to a receiving surface such as the deck 12 of the watercraft 10. Following the attachment by use of fasteners, caps 162 (FIG. 11) are received in the mounting cavities 110 over the fasteners.

Figure 4:
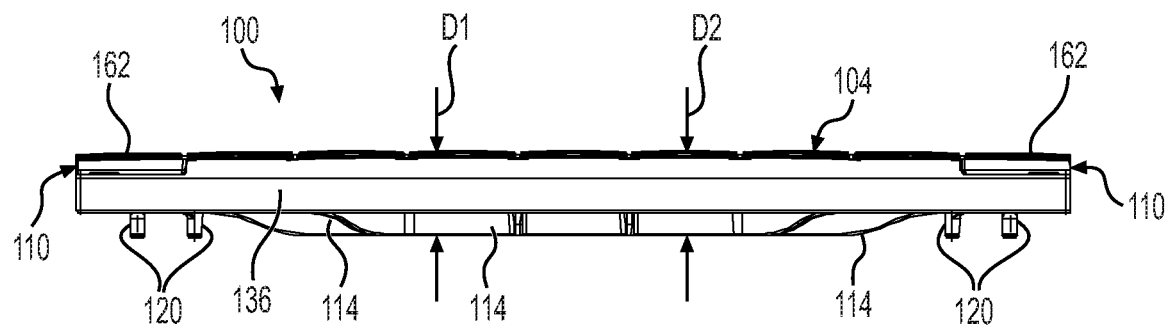
Figure 5:
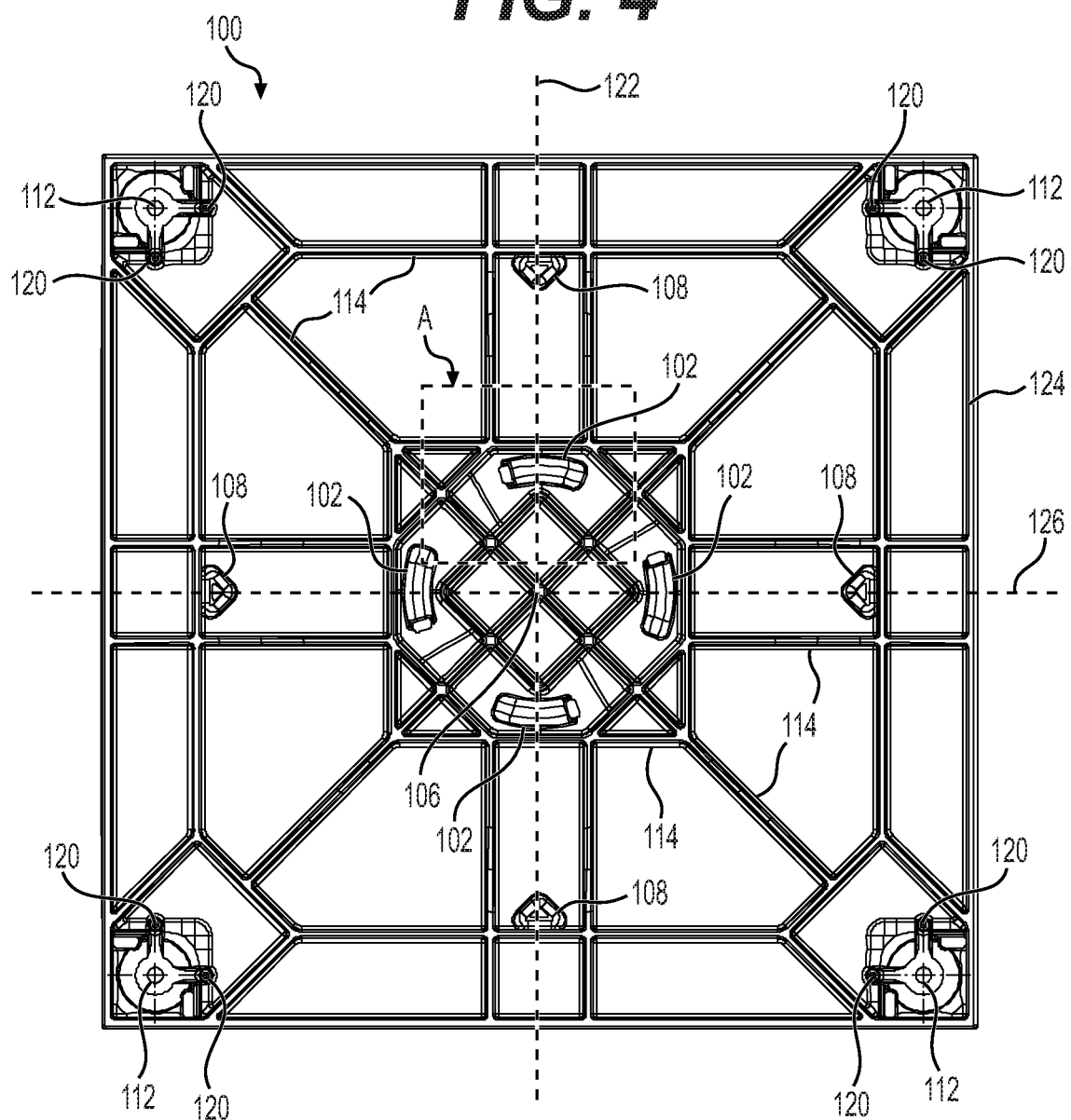
Figure 7:
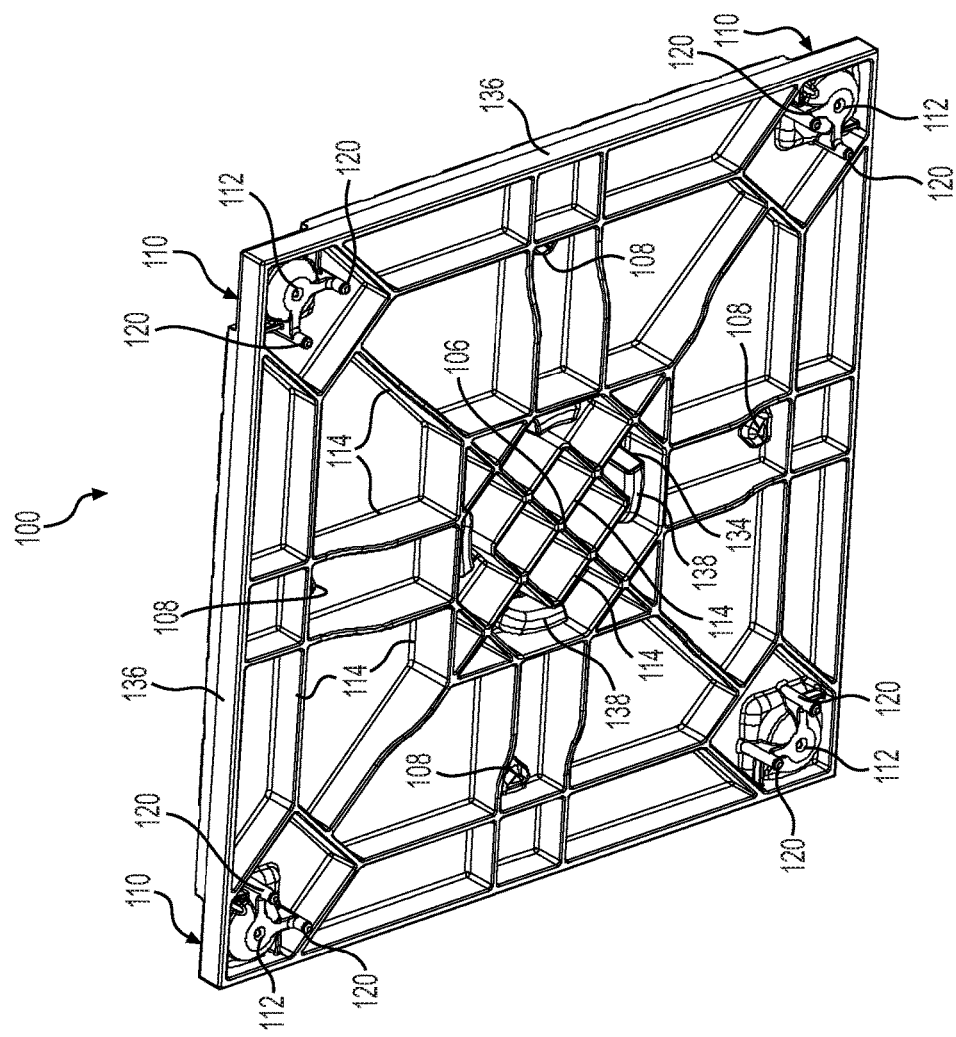

As shown particularly on FIGS. 4, 5 and 7, a lower side of the floor tile 100 comprises a number of reinforcing ribs 114 for supporting vertical loads applied on the floor tile 100 and for distributing such loads across the floor tile 100. In the embodiment as illustrated, a minimum depth of the reinforcing ribs 114 is substantially equal to a depth 'D1' of the perimetric wall 136. The reinforcing ribs 114 extends further from the upper surface 104 near the common center of curvature 106 of the four arcuate slots 102 at a maximum depth 'D2'.

FIGS. 5 and 7 further show locators 120, which are molded protrusions of the floor tile 100 that extend underneath the upper surface 104 of the floor tile 100. The locators 120 serve to locate the floor tile 100 with respect to the receiving structure onto which the floor tile 100 is mounted during assembly. As illustrated, a length of the locators 120 extends substantially to reach the maximum depth 'D2' of the reinforcing ribs 114. It is contemplated that the locators 120 could be omitted.

Two of the positioning cavities 108 are diametrically opposed about the common center of curvature 106 of the four arcuate slots 102 and are disposed along a first axis 122 passing through the common center of curvature 106 of the four arcuate slots 102 and through two of the four arcuate slots 102. The first axis 122 is parallel to a side 124 of the floor tile 100. The other two positioning cavities 108 are diametrically opposed about the common center of curvature 106 of the four arcuate slots 102 and are disposed along a second axis 126 passing through the common center of curvature 106 of the four arcuate slots 102 and through another two of the four arcuate slots 102. The second axis is perpendicular to the first axis 122. The positioning cavities 108 are located at equal distances from the common center of curvature 106 of the four arcuate slots 102.

FIGS. 6, 8 and 9 illustrate dimensions of the floor tile 100 according to a non-limiting example. Dimensions of the floor tile 100 shown on FIGS. 6, 8 and 9 are in millimeters (mm), except for angles, which are in degrees. Not all dimensions are shown on FIGS. 6, 8 and 9 for clarity purposes. In the context of the present disclosure, the term 'about' used in relation to numerical values of lengths or angles express that absolute equality to the measurements as shown and described is not required, inasmuch as various parts shown in the drawings can interoperate despite normal manufacturing tolerances.

The floor tile 100 has a square shape with a side length of about 458 mm. In the present embodiment, the floor tile 100 has a side length of 458.4 mm (18 inches). It is contemplated that in some other embodiments, the floor tile 100 could have a side length in the range of 458 mm+/−5%. The upper surface 104 is divided in small squares 130 having a side length of about 49 mm. In the present embodiment, the small squares 130 have a side length of 49.3 mm. It is contemplated that in some other embodiments, the small squares 130 could have a side length in the range of 49 mm+/−5%. Each small square 130 is further divided into four triangles 132 to form the gripping texture. The mounting cavities 110 are of the same size and shape as the small squares 130. The positioning cavities 108 are triangularly shaped and each take the place of a triangle 132 in a square 130 in order to better integrate with the gripping texture formed by the triangles 132. It is contemplated that the positioning cavities 108 and the mounting cavities 110 could have different shapes and sizes.

Figure 6A:
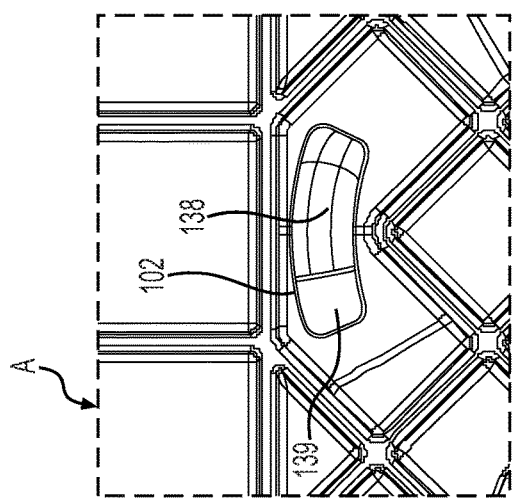
Figure 6B:
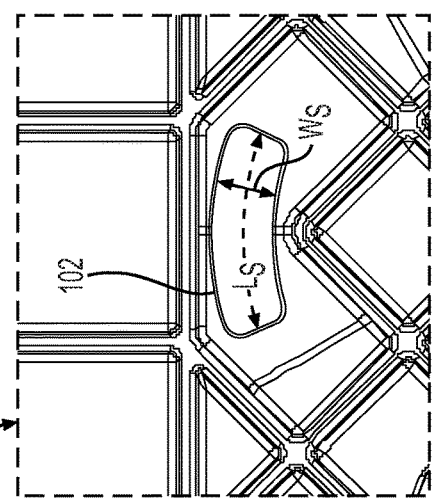

A sum of angular sweeps 134 of the four arcuate slots 102 of the floor tile 100 is less than 180 degrees. Each angular sweep 134 is for example equal to about 40 degrees. In the present embodiment, each arcuate slot 102 has an angular sweep of 40.3 degrees. It is contemplated that in some other embodiments, the arcuate slots 102 could have angular sweeps of 40 degrees+/−5%. FIG. 6b shows details of a portion A of FIG. 5, the bottom 138 being cut away from the Figure to better illustrate dimensions of the arcuate slots. As shown on FIG. 6b, each of the four arcuate slots 102 has an arc length '$L_S$' measured substantially at a middle of a width '$W_S$' of the arcuate slot 102 while following a curvature of the arcuate slots 102. The arc length '$L_S$' is about equal to one tenth of the side length of the floor tile 100, for example about 45 mm. In the present embodiment, the arc length '$L_S$' is 45.2 mm. It is contemplated that in some other embodiments, the arc length '$L_S$' could be in the range of 45 mm+/−5%. The width '$W_S$' is substantially constant along the length '$L_S$' of the arcuate slot 102. The width '$W_S$' is about equal to one fifth of the arc length '$L_S$' for example about 9 mm. In the present embodiment, the width '$W_S$' is 9.5 mm. It is contemplated that in some other embodiments, the width '$W_S$' could be in the range of 9 mm+/−5%. In an aspect, given that the floor tile 100 may be mounted on the watercraft 10 or on another watercraft on which people may walk barefoot, the width '$W_S$' of the arcuate slots 102 may be sufficient small to prevent the accidental insertion of a toe.

The common radius of curvature of the four (4) arcuate slots 102 as measured from the common center of curvature 106 to the middle of the width '$W_S$' of the arcuate slots 102 may be equal to about 1.3 to 1.5 times the arc length '$L_S$' of the four arcuate slots 102. In the present embodiment, the common radius of curvature of the four arcuate slots 102 is 64 mm. It is contemplated that in some other embodiments, the common radius of curvature of the four arcuate slots 102 could be the range of 64 mm+/−5%. The positioning cavities 108 are located radially outward of the four arcuate slots 102. In some embodiments, a center of each positioning cavity 108 is at a distance from the common center of curvature 106 of the four arcuate slots 102 that is in a range between twice the common radius of curvature of the four arcuate slots 102 and half the minimum side length of the floor tile 100. In the present embodiment, the center of each positioning cavity 108 is at a distance of 168 mm from the common center of curvature 106 of the four arcuate slots 102. It is also contemplated that in some other embodiments, this distance could be in a range of 168 mm+/−5%.

In some embodiments, the depth 'D1' of the perimetric wall 136 of the floor tile 100 is about 28 mm, this value being exceeded by some of the ribs 114. In the present embodiment, the depth 'D1' of the perimetric wall 136 floor tile 100 is 28 mm. It is contemplated that in some other embodiments, the depth 'D1' of the perimetric wall 136 floor tile 100 may be in the range of 28 mm+/−5%. A common depth of the four arcuate slots 102 defined by their respective bottoms 138 may for example be substantially equal to the depth 'D1' of the perimetric wall 136, at about 28 mm. In the present embodiment, the common depth of the arcuate slots 102 is 28.2 mm. It is contemplated that in some other embodiments, the common depth of the arcuate slots 102 may be in the range of 28 mm+/−5%. The positioning cavities 108 have a conical shape, for example with an opening of about 36 degrees, to facilitate the insertion of a locating pin (shown on later Figures) therein. In the present embodiment, the opening of the positioning cavities 108 is 35.7 degrees. It is contemplated that in some other embodiments, the positioning cavities 108 may have openings in the range of 36 degrees+/−5%. A depth 'D3' of the at least one positioning cavity 108 may be less than the depth of the arcuate slots 102.

Figure 12:
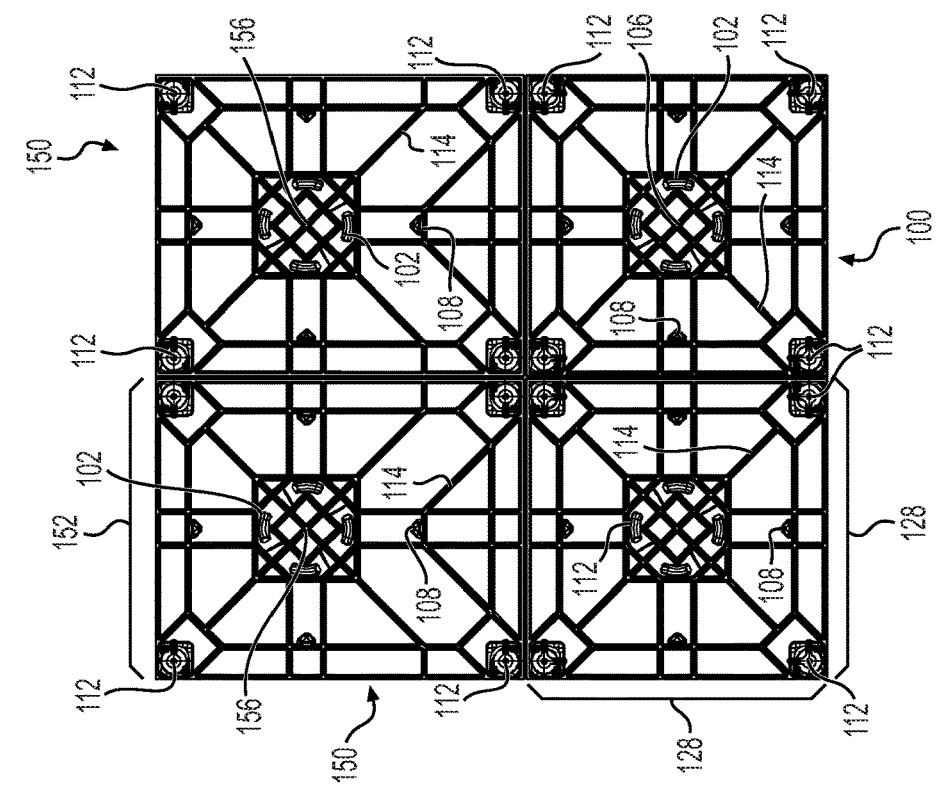
FIG. 12 is a bottom plan view of the assembly of FIG. 10.
Figure 11:
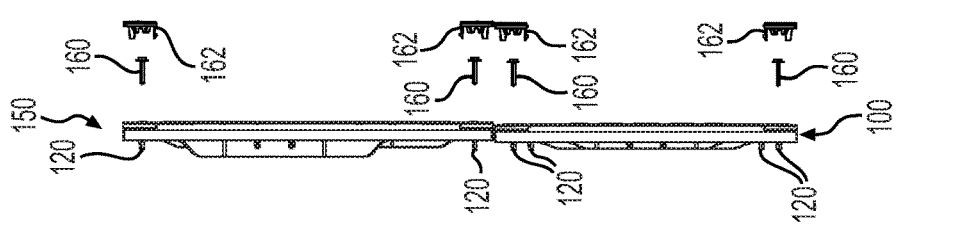
FIG. 11 is an elevation view of the assembly of FIG. 10.
Figure 10:
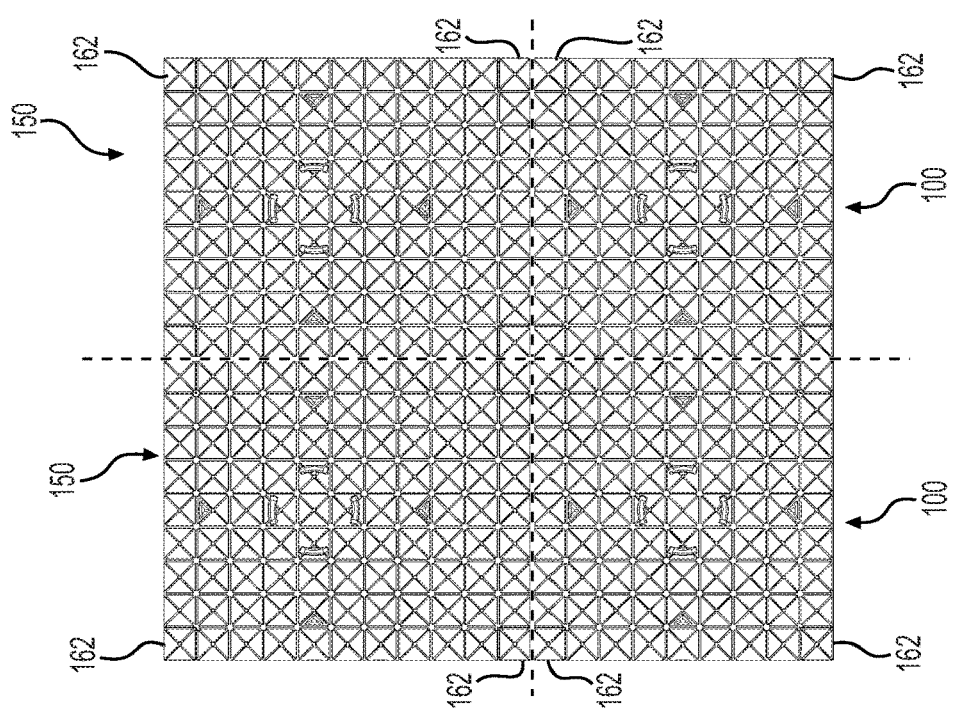
FIG. 10 is a top plan view of an assembly showing a plurality of floor tiles in accordance with an embodiment of the present technology.
Figure 13:
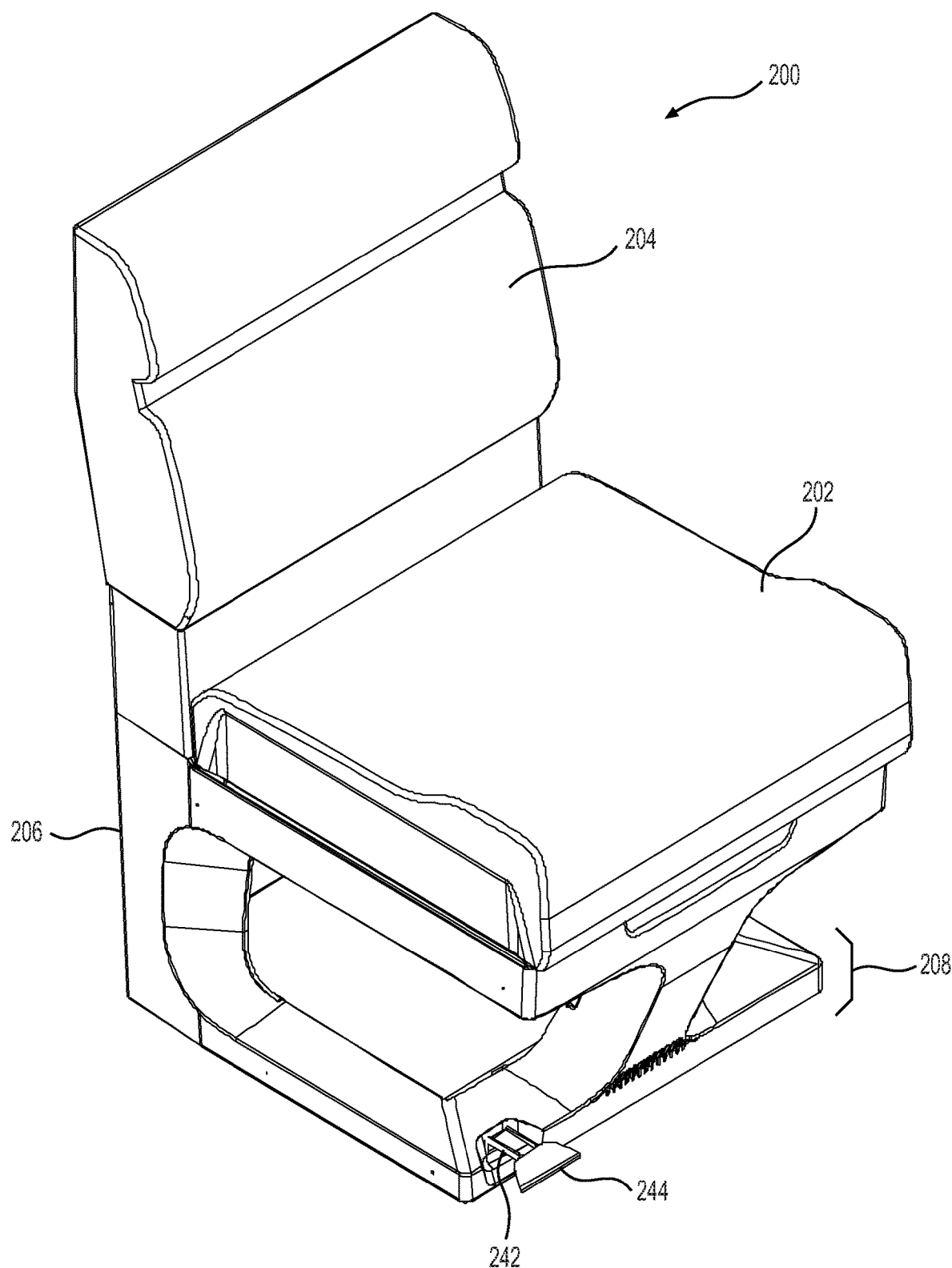
FIG. 13 is a top right perspective view of a chair mountable to the floor tile of FIG. 3a in accordance with an embodiment of the present technology.
Figure 17:
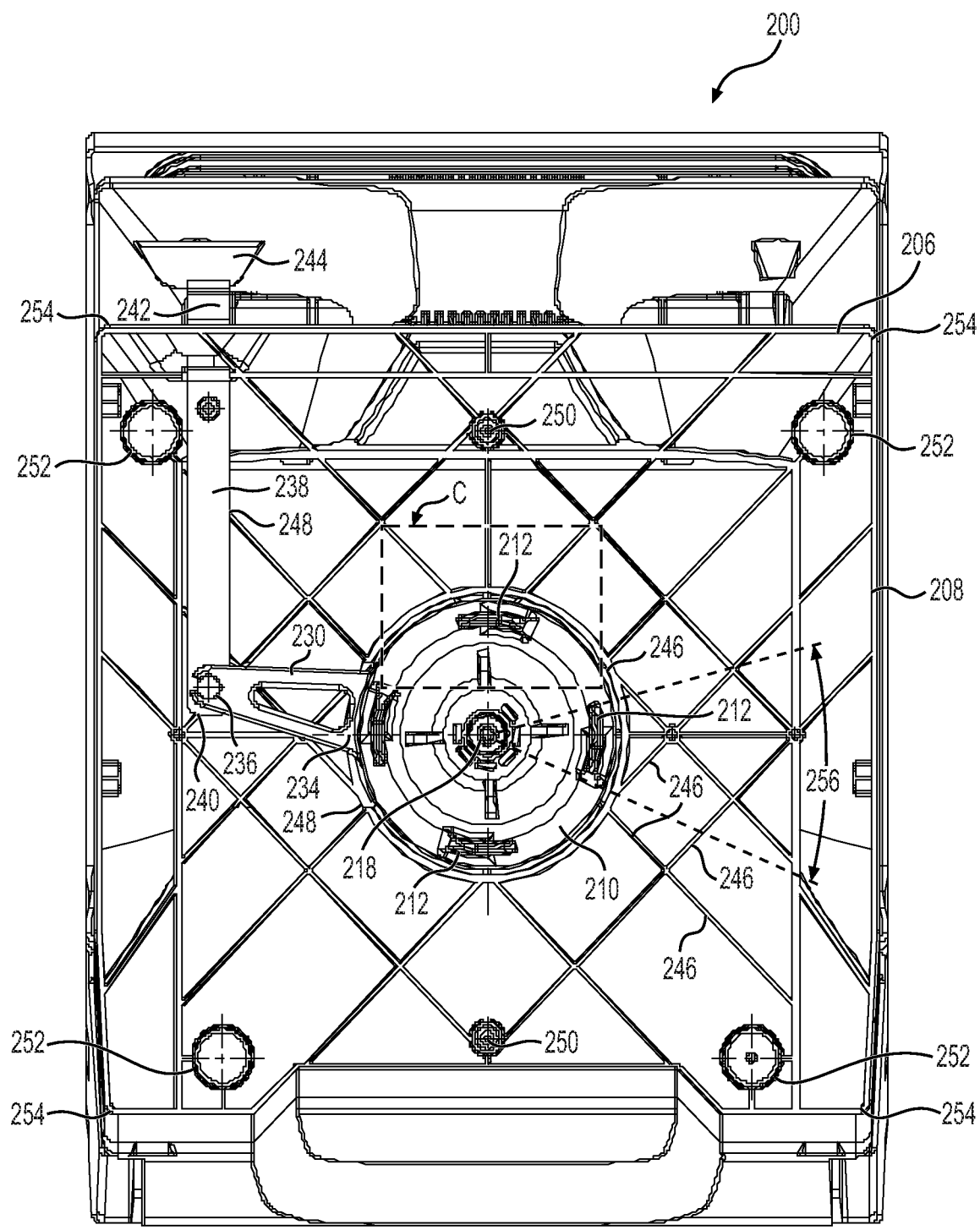
FIG. 17 is a bottom plan view of the chair of FIG. 13.
Figure 18:
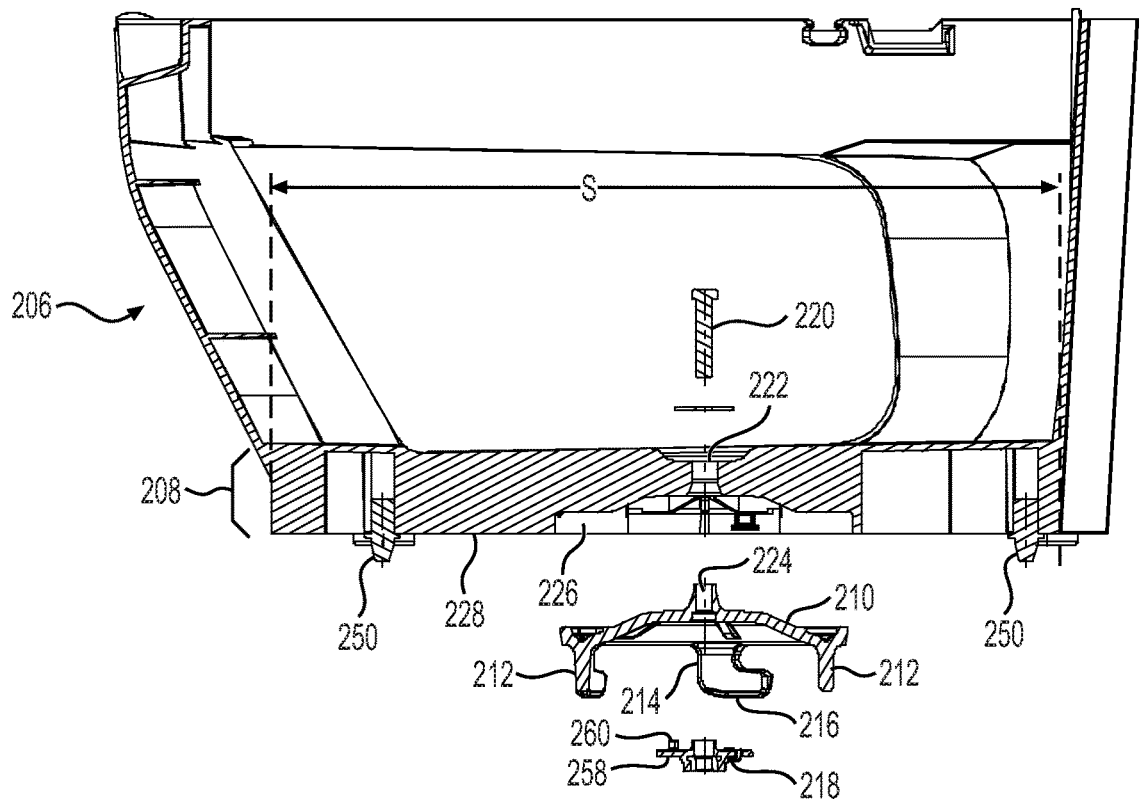
FIG. 18 is a partial, left side cutaway and exploded view of the chair of FIG. 13.

Although the floor tile 100 of FIGS. 3a to 9 has a square shape, the present disclosure is not so limited. For example, FIGS. 10 to 12 show an assembly of four floor tiles including two square floor tiles 100 (i.e. a rectangular floor tile have equal adjacent sides) and two rectangular floor tiles 150 having unequal adjacent sides. The rectangular floor tiles 150 are similar to the square floor tiles 100 and generally comprise the same components, differences between the floor tiles 100 and 150 being expressed hereinbelow.

A minimum side length 152 of the floor tiles 150 is equal to the side length 128 of the square floor tiles 100 so that the rectangular floor tiles 150 may be positioned adjacent to the square floor tiles 100, as shown on FIGS. 10 to 12, while preserving an alignment of the through apertures 112 and of the mounting cavities 110 of the square floor tiles 100 with through apertures 112 and the mounting cavities 110 of the rectangular floor tiles 150 across the deck 12. Also, while the common center of curvature 106 of the four arcuate slots 106 of the square floor tile 100 is centrally positioned on the square floor tile 100, common centers of curvature 156 of four arcuate slots 102 of each of the rectangular floor tiles 150 are not centrally located within the rectangular floor tiles 150. It is contemplated that the common center of curvature 156 of the four arcuate slots 102 could be centered in the rectangular floor tile 156.

Turning now to FIG. 11, fasteners 160 are inserted via the through apertures 112 of the floor tiles 100 and 150 for their attachment on the deck 12 or to another receiving structure. The caps 162 are then positioned in the mounting cavities 110 of the floor tiles 100 and 150, over the through apertures 112 and the fasteners 160. As shown on FIG. 10, an upper surface of the caps 162 has the same gripping texture formed by the small squares 130 and the triangles 132 as on the upper surface of the floor tiles 100 and 150 so that a substantially continuous finish may be provided between the upper surface 104 of the floor tiles 100 and 150 and the caps 162.

Without limitation, the floor tiles 100 and 150 may be molded from composite materials, for example a thermoplastic such as polypropylene or nylon impregnated with glass fiber.

An example of an accessory that can be mounted on the floor tiles 100 and 150 will now be described in relation to FIGS. 13-18. Although other accessories, for example a table and other accessories conventionally present on boats, such as sun pads and coolers, may be mounted on the floor tiles 100 and 150, FIGS. 13 to 18 describe a chair 200, which is a non-limiting example of a variety of accessories. An upper portion of the accessory, comprising a seat 202 and a backrest 204, is specific to the chair 200. Several elements that are also present in other accessories and that will be described below are attached to a base having features common to the base 206 of the chair 200 so as to permit attachment to the floor tiles 100, 150.

The base 206 supports the seat 202 and the backrest 204. Other accessories may have differently shaped bases. A bottom section 208 of the base 206 is adapted for mating with the floor tiles 100 or 150 so other accessories will also include lower base sections having a similar structure as the bottom section 208, other components as described below being mounted to the lower base sections of the other accessories.

Figure 23:
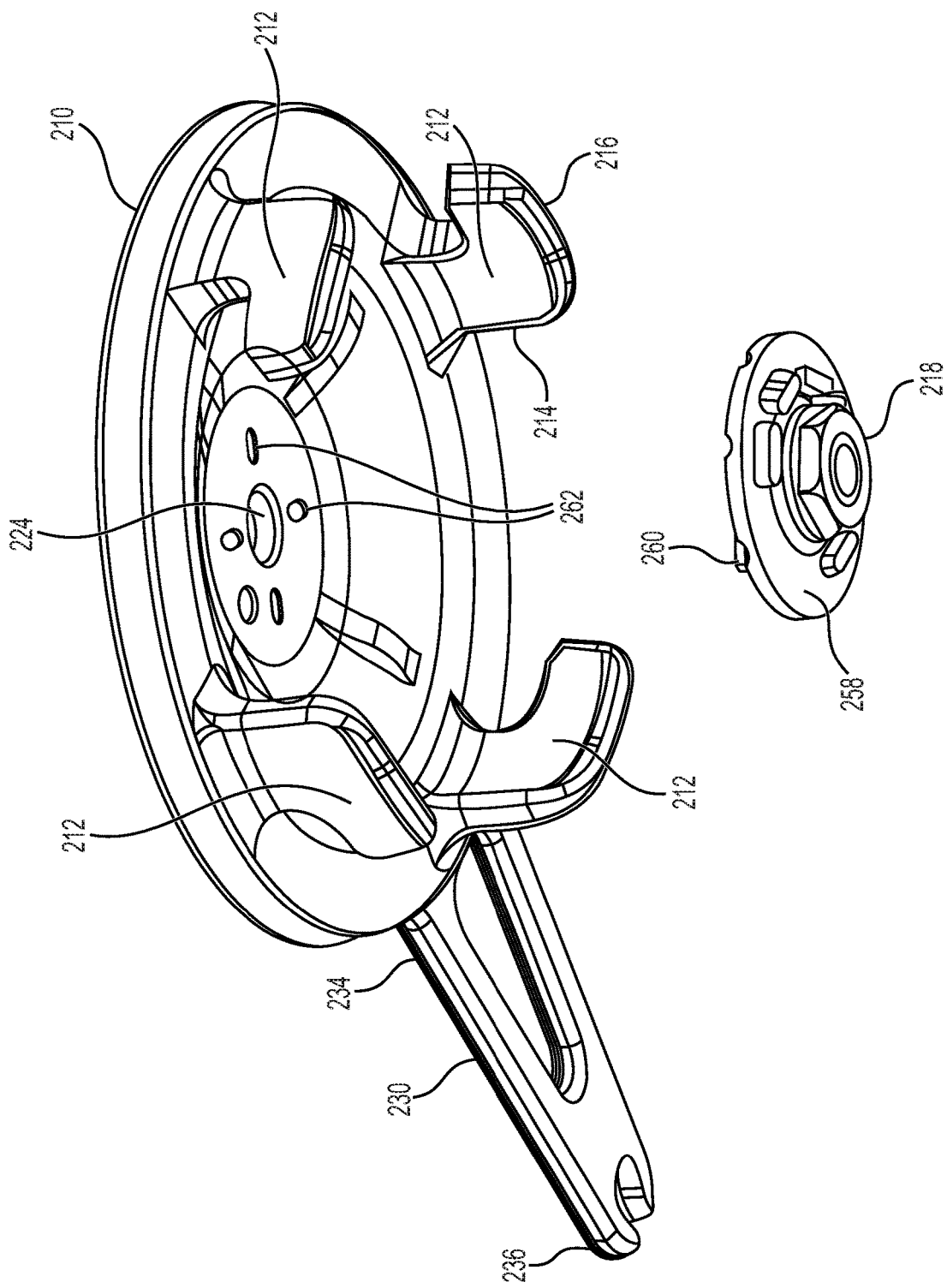
FIG. 23 is a lower left perspective and view of the disk, which forms the attachment of the chair of FIG. 13.

An attachment member, in the form of a disk 210, is pivotally mounted to the base 206. More specifically, the disk 210 is mounted to the bottom section 208. Other types of attachment members are contemplated. The disk 210 has four arcuate hooks 212 that extend under the bottom section 208. It is contemplated that only two or three arcuate hooks 212 could be provided. The arcuate hooks 212 are generally L-shaped. Each arcuate hook 212 includes a foot 214 fixedly connected to the disk 210 and a free end 216 extending perpendicularly from the foot 214. The feet 214 are narrower than the free ends 216 so that the free ends 216 extend beyond the feet 214 along a circumference of the disk 210. A nut 218 is disposed underneath the disk 210 and a bolt 220 is inserted through a bore 222 provided in the bottom section 208 and through a bore 224 provided in the disk 210 so that the bolt 220 engages the nut 218, the disk 210 and the base 206. In this manner, the disk 210 is pivotally mounted to the base 206 by the bolt 220 and the nut 218. A pivot axis of the disk 210 is defined by an axis of the bolt 220. It is contemplated that a fastener other than a bolt 220 could be used. As shown on FIG. 23, the nut 218 includes a flange 258 having projections 260 that are received within recesses 262 of the disk 210 in order to prevent a rotation of the nut 218 with respect to the disk 210.

In the configuration of the base 206 as illustrated, a major portion of the disk 210 is located within a recess 226 provided in the lower portion 208 of the base 206; however the arcuate hooks 212 extend underneath a lower edge 228 of the base 206.

A link 230 extends radially outwards from the disk 210 and is located within the base 206, more particularly within the bottom section 208. The link 230 has a medial end 234 connected to a periphery of the disk 210 and a lateral end 236 opposite from the medial end 234. An arm 238 has a proximal end 240 pivotably connected to the lateral end 236 of the link 230 and a distal end 242 protruding outside of the base 206. A handle 244 is mounted to the distal end 242 of the arm 238. Sliding the arm 238 partially in or out of the base 206 by action of the handle 244 on its distal end 242 causes pivoting of link 230 and of the disk 210 about the pivot axis of the disk 210. In the present embodiment, the disk 210 and the link 230 are configured to pivot over a range of 15 degrees. It is contemplated that in some other embodiments, the disk 210 and the link 230 could be configured to pivot up to a range of 15 degrees+/−5%.

Without limitation, the disk 210 and the arcuate hooks 212 may be molded as a single piece from composite materials, for example a thermoplastic such as polypropylene or nylon impregnated with glass fiber. The disk 210 and the arcuate hooks 212 may also be made of steel, aluminum, or another metal. Other components of the chair 200, including the base 206 and its lower end 208 may be manufactured using various plastics, such as thermoplastic, steel, aluminum or another metal, and the like.

As illustrated, the pivot axis of the disk 210 is substantially positioned at a center of a generally square shape defined by the bottom section 208 of the base 206. It is contemplated that the pivot axis of the disk 210 may be positioned differently, for example being placed closer to the front or the back of the chair 200, by displacing the disk 210, the bolt 220, the bore 222 and the recess 226 within the bottom section 208 of the base 206.

Reinforcing ribs 246 are formed within the bottom section 208. The reinforcing ribs 246 surround the recess 226 where the disk 210 is located. Indentations 248 are formed on some of the reinforcing ribs 246 to provide a void allowing displacing the link 230 and the arm 238.

The four arcuate hooks 212 share a common center of curvature at the pivot axis of the disk 210. The four arcuate hooks 212 also share a common radius of curvature. The four arcuate hooks 212 are evenly distributed on a circumference of the disk 210 so that the pivot axis of the disk 210 and mid-points of two of the arcuate hooks 212 define a first axis on which these two arcuate slots are diametrically opposed. A second axis perpendicular to the first axis is defined by the pivot axis of the disk 210 and mid-points of another two of the arcuate hooks 212.

Two locating pins 250 extend under the bottom section 208 of the base 206. The locating pins 250 are located radially outward from the pivot axis of the disk 210, at equal distances from pivot axis of the disk 210. The pivot axis of the disk 210 and the two locating pins 250 are positioned on an axis parallel to a lateral side of the chair 200. As illustrated, one of the locating pins 250 is positioned toward the front of the chair 200 and another of the locating pins 250 is positioned toward the back of the chair 200. It is contemplated that three or four locating pins 250 may be distributed on the bottom section 208 of the base 206, each locating pin 250 being at equal distances form the pivot axis of the disk 210 and at equal distances from each other. It is also contemplated that only a single locating pin 250 could be provided. Instead of the locating pins 250, it is contemplated that differently shaped projections could extend under the bottom section 208 of the base 206.

A rubber support 252 is provided near each corner 254 of the base 206. The rubber supports 252 extend under the bottom section 208.

Figure 19:
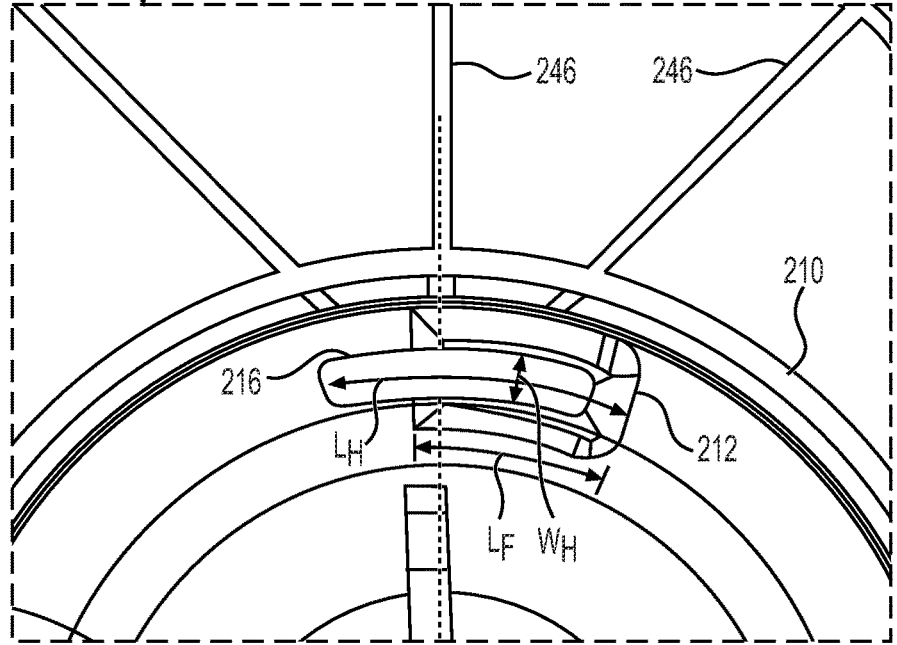
FIG. 19 is a close-up view of portion C of FIG. 17 showing details of an arcuate hook of the chair of FIG. 13.

In the illustrated embodiment, a side length 'S' (FIG. 18) of the bottom section 208 of the base 206 is about 458 mm. In the present embodiment, the side length 'S' of the bottom section 208 of the base 206 is 458.4 mm. It is contemplated that in some other embodiments, the side length 'S' of the bottom section 208 of the base 206 could be in the range of 458 mm+/−5%. A sum of angular sweeps 256 of two of the arcuate hooks 212 is less than 90 degrees and a sum of angular sweeps 256 of the four arcuate hooks 212 is less than 180 degrees. Each angular sweep 256 is for example equal to about 36 degrees. In the present embodiment, the angular sweep 256 of each arcuate hook 212 is 36 degrees. It is contemplated that in some other embodiments, the angular sweep 256 of the arcuate hooks could be in the range of 36 degrees+/−5%. As shown in FIG. 19, each of the arcuate hooks 212 has an arc length '$L_H$' measured substantially at a middle of a width '$W_H$' of the arcuate hook 212 while following a curvature of the arcuate hooks 212. The arc length '$L_H$' is about equal to one eleventh of a side length 'S' (FIG. 18) of the bottom section 208 of the base 206. In the present embodiment, the arc length '$L_H$' is 40 mm. It is contemplated that in some other embodiments, the arc length '$L_H$' could be in the range of 40 mm+/−5%. The width '$W_H$' ranges between one fourth and one fifth of the arc length '$L_H$'. In the present embodiment, the width '$W_H$' is 8 mm. It is contemplated that in some other embodiments, the width '$W_H$' could be in the range of 8 mm+/−5%. The free ends 216 extend over the arc length '$L_H$', which is greater than an arc length '$L_F$' of each of the feet 214.

The common radius of curvature of the arcuate hooks 212 is in a range between 1.4 to 1.8 times the arc length '$L_H$' of the arcuate hooks 212. In the present embodiment, the common radius of curvature of the arcuate hooks 212 is 64 mm. It is contemplated that in some other embodiments, the common radius of curvature of the arcuate hooks 212 could be in the range of 64 mm+/−5%. The locating pins 250 are located radially outward from the pivot axis of the disk 210. For example, the locating pins 250 may be at a distance from the pivot axis of the disk 210 that is in a range between twice the common radius of curvature of the arcuate hooks 212 and half the side length 'S' of the bottom section 208 of the base 206. In the present embodiment, each locating pin 250 is at a distance of 168 mm from the pivot axis of the disk 210. It is also contemplated that in some other embodiments, this distance could be in a range of 168 mm+/−5%.

Figure 20:
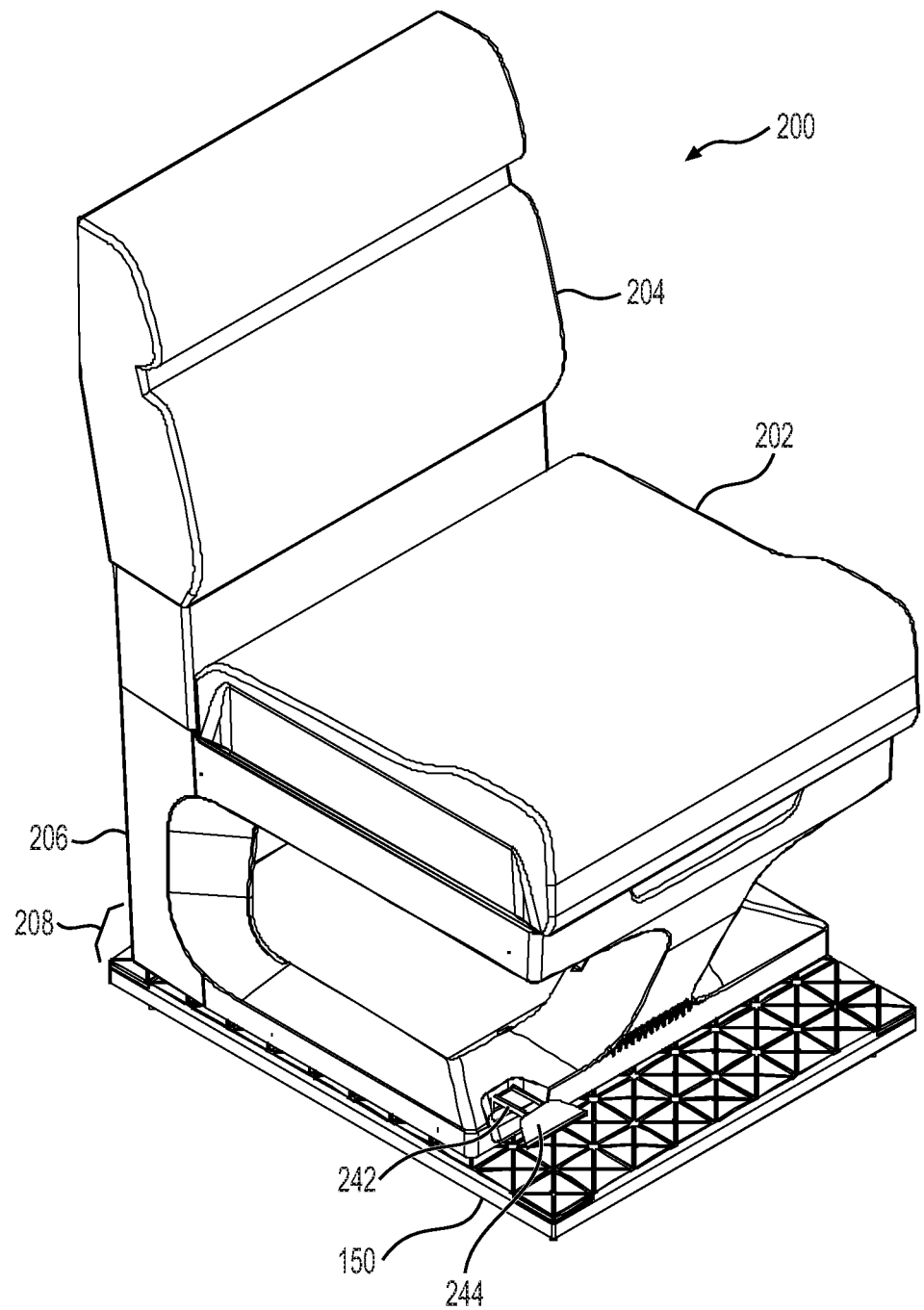
FIG. 20 is a top right perspective view of the chair of FIG. 13 placed on a floor tile.
Figure 21:
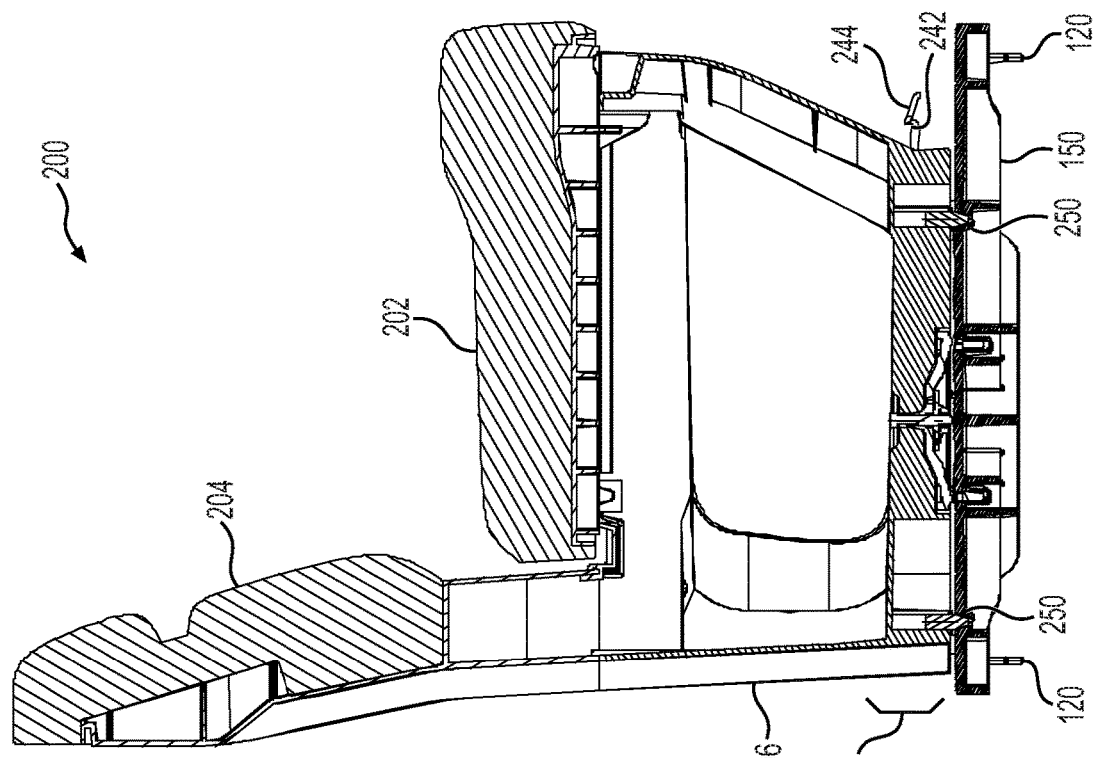
FIG. 21 is a left side elevation view of the chair of FIG. 13 placed on a floor tile.
Figure 22:
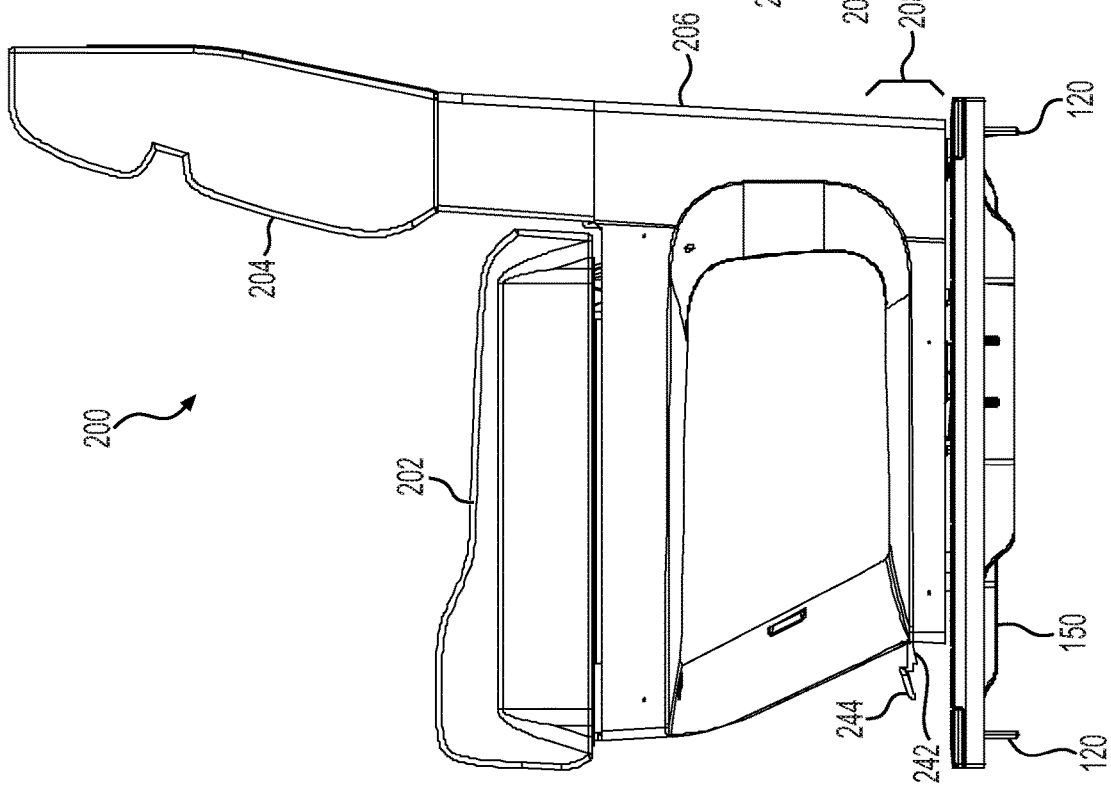
FIG. 22 is a right side cutaway view of the chair of FIG. 12 placed on a floor tile.

FIGS. 20 to 22 show how the chair 200 may selectively be placed on the floor tile 150. As shown on FIGS. 20 to 22, the handle 244 and the distal end 242 of the arm 238 are pulled outward from the base 206 so the chair 200 is not yet attached to the floor tile 150. The chair 200 would be mounted in the same way to the floor tile 100. Other accessories provided with a base similar to the base 206 would be connected to the tile 100 or 150 in a similar way. A manufacturer of the watercraft 10 may allow installation of accessories on certain areas of the deck 12 and not on other areas. To this end, some areas of the deck 12 may be covered with floor tiles (not shown) having no arcuate slot or positioning cavity. These floor tiles share a similar rectangular shape and size as the floor tiles 100 or 150. These floor tiles have similar mounting cavities 110 and through apertures 112 in each of their corners for attachment on the deck 12 in the same manner as the floor tiles 100 and 150. These floor tiles also have the same gripping texture formed by the small squares 130 and the triangles 132 so that a consistent finish is obtained on the entire surface of the deck 12.

Figure 24A:
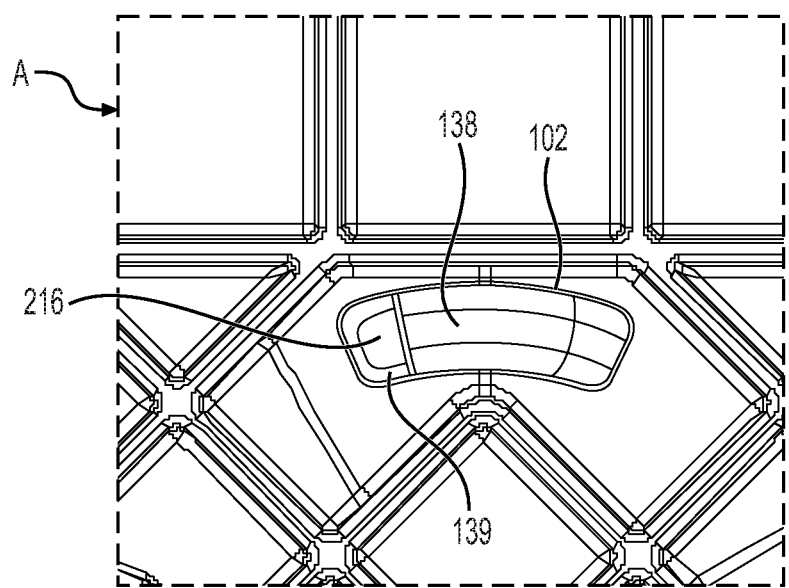
FIG. 24a is a close-up view the portion A of FIG. 5 showing an arcuate hook inserted in an arcuate slot in an unlocked position.

In operation, to attach the chair 200 to the floor tile 150, the arm 238 and the handle 244 are initially pulled out from the bottom section 206 of the chair 200. In this manner, the four arcuate hooks 212 are positioned for alignment with the four arcuate slots 102. The chair 200 is properly positioned on the floor tile 150 by aligning the two locating pins 250 with corresponding ones of the four positioning cavities 108 and the four arcuate hooks 212 are inserted in the four arcuate slots 102, in an unlocked position as illustrated on FIG. 24a (not to scale). In this position of the chair 200 on the floor tile 150, the common center of curvature 156 of the arcuate slots 102 is coaxial with the pivot axis of the disk 210. An overall height of the arcuate hooks 212 is selected so that the free ends 216 substantially reach the bottoms 138 of the arcuate slots 102. Given that (a) the arc length '$L_S$' of the arcuate slots 102 is greater than the arc length '$L_H$' of the arcuate hooks 212, (b) the width '$W_S$' of the arcuate slots 102 is greater than the width '$W_H$' of the arcuate hooks 212, (c) the radius of curvature of the arcuate slots 102 is equal to the radius of curvature of the arcuate hooks 212, and (d) the distance from the positioning cavities 108 to the common center of curvature 106 of the arcuate slots 102 is equal to the distance from the locating pins 250 to the pivot axis of the disk 210, it follows that the arcuate hooks 212 are easily received in the arcuate slots 102 and the locating pins 250 are easily received in the positioning cavities 108. It is contemplated that differently shaped projections extending under the floor tile 150 may be received in the positioning cavities 108.

Figure 24B:
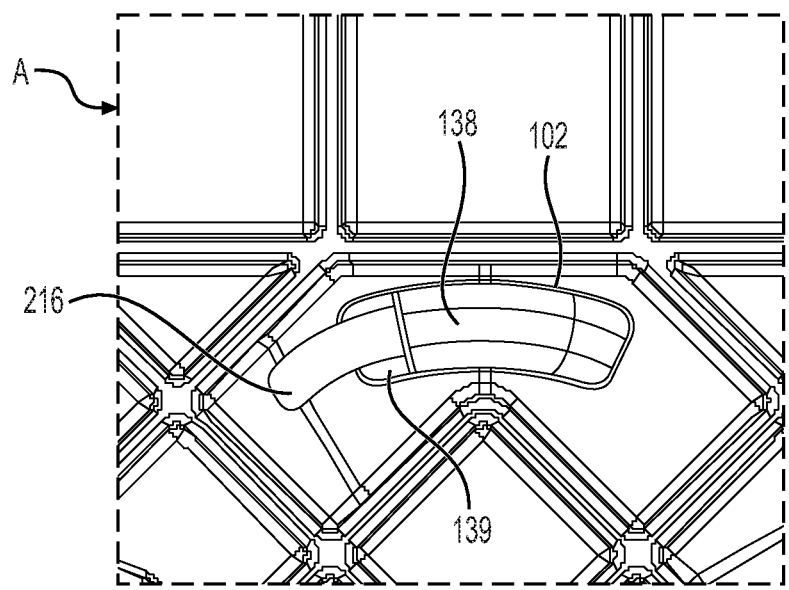
FIG. 24b is a close-up view the portion A of FIG. 5 showing an arcuate hook inserted in an arcuate slot in a locked position.

When the chair 200 is placed on the floor tile 150, the four rubber supports 252 abut against the upper surface 104 the floor tile 150. To lock the chair 200 in position on the floor tile 150, the arm 238 is pushed inwards towards the base 206 until the handle is substantially flush with the front outer edge of the base 206. This action of the arm 239 causes pivoting of the link 230 and the disk 210 by up to about 15 degrees in a first direction, which is counter-clockwise in the shown embodiment. As a result, the arcuate hooks 212 rotate within the arcuate slots 102. Pivoting the disk 210 causes the free ends 216 to protrude from the arcuate slots 102 via the lateral openings 139, as illustrated on FIG. 24b (not to scale). In the present embodiment, the free ends 216 may protrude beyond the lateral openings 139 by up to 12.2 degrees. It is contemplated that in some other embodiments, the maximum protrusion of the free ends 216 could be in a range of 12 degrees+/−5%. This contact between the arcuate hooks 212 and the underside of the tile 100 at the lateral openings 139 of the arcuate slots 102 pulls the chair 200 towards the floor tile 150 and presses the rubber supports 252 against the upper surface 104 of the floor tile 150. As such, downward vertical loads are passed from the chair 200 to the floor tile 150 via the rubber supports 252 rather than the attachment system. The about 15 degrees of rotation of the disk 210 provides sufficient contact between the arcuate hooks 212 and the underside of the tile 100 at the lateral openings 139 of the arcuate slots 102 to take up significant pull-out loads that may be applied on the chair 200. To dismount the chair 200 from the floor tile 150, the arm 238 is pulled outward from the base 206 to pivot the link 230 and the disk 210 by about 15 degrees in a second direction, which is clockwise in the shown embodiment, the second direction being opposite from the first direction. In this manner, the feet 216 of the arcuate hooks 212 are substantially aligned with the arcuate slots 102 of the tile 150, without any protrusion of the feet 216 beyond the lateral openings 139. The chair 200 may then be removed from the floor tile 150.

It may be noted that the chair 200 could be similarly mounted on the floor tile 100 or 150 while having only two arcuate hooks 212 mounted on the disk 210, these two arcuate hooks 212 being received in corresponding two of the arcuate slots 102. Also, in embodiments in which the floor tile 100 has four positioning cavities 108, the chair 200 may be mounted thereon in any of four perpendicular directions, whether the chair includes one or more locating pins 250. It is also contemplated that the number and position of the positioning cavities 108 and locating pins 250 could be selected such that the accessory could only be mounted in a particular direction.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A floor tile, comprising:
four arcuate slots formed on an upper surface of the floor tile, the four arcuate slots having a common radius of curvature and being defined about a common center of curvature of the four arcuate slots, a sum of angular sweeps of the four arcuate slots being less than 180 degrees, wherein the four arcuate slots are consecutively formed on a circumference defined about the common center of curvature, and wherein at least one of the four arcuate slots is disposed diametrically opposite to an other one of the four arcuate slots; and
at least one positioning cavity formed on the upper surface of the floor tile and located radially outward from the common radius of curvature of the four arcuate slots.

2. The floor tile of claim 1, wherein:
the floor tile has a rectangular shape;
each of the four arcuate slots has an arc length of about one tenth of a minimum side length of the floor tile and a width of about one fifth of the arc length;
the common radius of curvature of the four arcuate slots is in a range of 1.3 to 1.5 times the arc length of each of the four arcuate slots; and
the at least one positioning cavity is located at a distance from the common center of curvature of the four arcuate slots that is in a range between twice the common radius of curvature of the four arcuate slots and half the minimum side length of the floor tile.

3. The floor tile of claim 1, wherein the at least one positioning cavity comprises two positioning cavities.

4. The floor tile of claim 3, wherein the two positioning cavities are diametrically opposed about the common center of curvature of the four arcuate slots.

5. The floor tile of claim 3, wherein the two positioning cavities are located at equal distances from the common center of curvature of the four arcuate slots.

6. The floor tile of claim 1, wherein the at least one positioning cavity is a positioning recess.

7. An accessory, comprising:
a base having a bottom section;
an attachment member pivotally mounted to the base about a pivot axis of the attachment member, the attachment member comprising at least two arcuate hooks extending under the bottom section of the base, each of the at least two arcuate hooks comprising a foot fixedly connected to the attachment member and extending perpendicularly from a plane of the attachment member, each of the at least two arcuate hooks further comprising a free end extending perpendicularly from the foot along an arc about the pivot axis, the free end protruding from the foot in an arcuate direction; and
at least one locating projection extending under the bottom section of the base and located radially outward from the pivot axis of the attachment member.

8. A floor tile, comprising:
four arcuate slots formed on an upper surface of the floor tile, the four arcuate slots having a common radius of curvature and being defined on a circumference about a common center of curvature of the four arcuate slots, wherein a sum of angular sweeps of solid arcuate sections of the upper surface spanning on the circumference between the arcuate slots is greater than 180 degrees; and
at least one positioning cavity formed on the upper surface of the floor tile and located radially outward from the common radius of curvature of the four arcuate slots.

9. The accessory of claim 7, wherein the foot and the free end of each of the at least two arcuate hooks and the attachment member form a unitary piece.

10. The accessory of claim 7, further comprising:
a link positioned within the base, the link having a medial end connected to the attachment member and a lateral end opposite from the medial end; and
an arm having a proximal end pivotably connected to the lateral end of the link and a distal end protruding outside of the base;
wherein sliding the arm partially in or out of the base by action on the distal end causes pivoting of the attachment member about the pivot axis of the attachment member.

11. The accessory of claim 10, further comprising reinforcing ribs disposed within the bottom section of the base and surrounding the attachment member, a void being formed in the reinforcing ribs to allow displacement of the arm and the link.

12. The accessory of claim 7, wherein a sum of angular sweeps of the at least two arcuate hooks is less than 90 degrees.

13. The accessory of claim 7, wherein two of the at least two arcuate hooks are diametrically opposed about the pivot axis of the attachment member.

14. The accessory of claim 7, wherein:
the at least two arcuate hooks comprise four arcuate hooks; and
the four arcuate hooks share a common radius of curvature.

15. The accessory of claim 14, wherein;
the pivot axis of the attachment member and mid-points of two of the four arcuate hooks define a first axis; and
the pivot axis of the attachment member and mid-points of another two of the four arcuate hooks define a second axis perpendicular to the first axis.

16. The accessory of claim 15, wherein the at least one locating projection comprises two locating projections.

17. The accessory of claim 7, wherein:
the attachment member comprises a disk pivotally mounted to the base;
the foot of each of the at least two arcuate hooks extends perpendicularly from the disk.

18. The accessory of claim 7, further comprising:
a nut disposed underneath the attachment member; and
a fastener engaging the nut, the attachment member and the base, the attachment member being pivotally mounted to the base by the fastener and the nut.

19. A floor tile and accessory assembly, comprising:
a floor tile, comprising:
four arcuate slots formed on an upper surface of the floor tile and defined about a common center of curvature of the four arcuate slots, and
at least one positioning cavity formed on the upper surface of the floor tile and located radially outward from a common radius of curvature of the four arcuate slots; and
an accessory adapted for being mounted on the floor tile, the accessory comprising:
a base having a bottom section,
an attachment member pivotally mounted to the base, the attachment member comprising between two and four arcuate hooks extending under the bottom section of the base, the arcuate hooks being selectively received in a corresponding number of the four arcuate slots of the floor tile, and
at least one locating projection extending under the bottom section of the base and located radially outward from a pivot axis of the attachment member, the at least one locating projection being selectively received in the at least one positioning cavity of the floor tile;
wherein:
pivoting the attachment member in a first direction causes locking of the arcuate hooks in the arcuate slots for attaching the accessory on the floor tile, and
pivoting the attachment member in a second direction opposite from the first direction causes unlocking of the arcuate hooks from the arcuate slots and allows removal of the accessory from the floor tile.

20. The assembly of claim 19, wherein the base of the accessory further comprises:
a link positioned within the base, the link having a medial end connected to the attachment member and a lateral end opposite from the medial end; and
an arm having a proximal end pivotably connected to the lateral end of the link and a distal end protruding outside of the base;
wherein sliding the arm partially in or out of the base by action on the distal end causes pivoting of the attachment member about the pivot axis of the attachment member and causes locking of the arcuate hooks selectively received in the corresponding number of the four arcuate slots of the floor tile.

21. The assembly of claim 19, wherein the pivot axis of the attachment member is a common center of curvature of the arcuate hooks.

* * * * *